(12) United States Patent
LeGendre et al.

(10) Patent No.: US 11,288,844 B2
(45) Date of Patent: Mar. 29, 2022

(54) COMPUTE AMORTIZATION HEURISTICS FOR LIGHTING ESTIMATION FOR AUGMENTED REALITY

(71) Applicant: Google LLC, Mountain View, CA (US)

(72) Inventors: Chloe LeGendre, Culver City, CA (US); Laurent Charbonnel, Los Angeles, CA (US); Christina Tong, Pleasanton, CA (US); Konstantine Nicholas John Tsotsos, San Francisco, CA (US); Wan-Chun Ma, Culver City, CA (US); Paul Debevec, Culver City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/733,376

(22) PCT Filed: Oct. 16, 2019

(86) PCT No.: PCT/US2019/056518
§ 371 (c)(1),
(2) Date: Jul. 15, 2020

(87) PCT Pub. No.: WO2021/076122
PCT Pub. Date: Apr. 22, 2021

(65) Prior Publication Data
US 2021/0166437 A1 Jun. 3, 2021

(51) Int. Cl.
*G06T 11/00* (2006.01)
*G06T 7/70* (2017.01)
(Continued)

(52) U.S. Cl.
CPC ............... *G06T 11/00* (2013.01); *G06T 3/20* (2013.01); *G06T 3/60* (2013.01); *G06T 7/70* (2017.01);
(Continued)

(58) Field of Classification Search
None
See application file for complete search history.

(56) References Cited

U.S. PATENT DOCUMENTS

2015/0215623 A1* 7/2015 Sanders ............... G06K 9/4661
375/240.08
2015/0279113 A1 10/2015 Knorr et al.
(Continued)

OTHER PUBLICATIONS

International Search Report and Written Opinion for Application No. PCT/US2019/056518, dated May 28, 2020, 13 pages.
(Continued)

*Primary Examiner* — Yanna Wu
(74) *Attorney, Agent, or Firm* — Brake Hughes Bellermann LLP

(57) ABSTRACT

Systems, methods, and computer program products are described that implement obtaining, at an electronic computing device and for at least one image of a scene rendered in an Augmented Reality (AR) environment, a scene lighting estimation captured at a first time period. The scene lighting estimation may include at least a first image measurement associated with the scene. The implementations may include determining, at the electronic computing device, a second image measurement associated with the scene at a second time period, determining a function of the first image measurement and the second image measurement. Based on the determined function, the implementations may also include triggering calculation of a partial lighting estimation update or triggering calculation of a full lighting estimation update and rendering, on a screen of the electronic computing device and for the scene, the scene using the partial lighting estimation update or the full lighting estimation update.

14 Claims, 9 Drawing Sheets

(51) Int. Cl.
*G06T 3/20* (2006.01)
*G06T 3/60* (2006.01)

(52) U.S. Cl.
CPC .............. *G06T 2207/10152* (2013.01); *G06T 2207/20084* (2013.01); *G06T 2207/20208* (2013.01); *G06T 2207/30244* (2013.01)

(56) References Cited

U.S. PATENT DOCUMENTS

2017/0018121 A1\* 1/2017 Lawson ................. G06T 17/00
2020/0151509 A1\* 5/2020 Sunkavalli ........... G06K 9/6262

OTHER PUBLICATIONS

Jiddi, et al., "Estimation of Position and Intensity of Dynamic Light Sources Using Cast Shadows On Textured Real Surfaces", 25th IEEE International Conference on Image Processing (ICIP), Oct. 7, 2018, pp. 1063-1067.
Madsen, et al, "Real-Time Image-Based Lighting for Outdoor Augmented Reality Under Dynamically Changing Illumination Conditions", International Conference on Graphics Theory and Applications Proceedings, Jan. 1, 2006, 9 pages.

\* cited by examiner

COMPUTE AMORTIZATION HEURISTICS FOR LIGHTING ESTIMATION FOR AUGMENTED REALITY

CROSS-REFERENCE TO RELATED APPLICATION

This application is a 35 U.S.C. § 371 National Phase Entry application from PCT/US2019/056518, filed on Oct. 16, 2019, entitled "COMPUTE AMORTIZATION HEURISTICS FOR LIGHTING ESTIMATION FOR AUGMENTED REALITY", the disclosure of which is incorporated by reference herein in its entirety.

TECHNICAL FIELD

This disclosure relates to Virtual Reality (VR) and/or Augmented Reality (AR) experiences and estimating lighting aspects associated with scenes in the VR and/or AR experiences.

BACKGROUND

Virtual Reality (VR) developers may share common challenges with visual effects developers. For example, in both visual effects environments and VR environments, at least two challenges for inserting content into a scene include matching camera viewpoints and lighting characteristics. Matching the camera viewpoint can be performed in real time using any number of algorithms. However, matching the lighting characteristics from a real world scene to content that is composited into a VR environment can be challenging when the intent is to ensure authentic and realistic looking content.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described. The method includes obtaining, at an electronic computing device and for at least one image of a scene rendered in an Augmented Reality (AR) environment, a scene lighting estimation captured at a first time period. The scene lighting estimation may include at least a first image measurement associated with the scene. The method may further include determining, at the electronic computing device, a second image measurement associated with the scene at a second time period where the second time period occurs after the first time period. The method may further include determining, at the electronic computing device, a function of the first image measurement and the second image measurement and based on the determined function, triggering, at the electronic computing device, calculation of a partial lighting estimation update or triggering calculation of a full lighting estimation update. The method may further include rendering, on a screen of the electronic computing device and for the scene, the scene using the partial lighting estimation update or the full lighting estimation update.

Particular implementations of the computer-implemented method may include any or all of the following features. In some implementations, the first image measurement and the second image measurement include respective ambient light intensity measurements for the scene, and the calculation of the full lighting estimation update is triggered if the determined function is above a predefined threshold and an elapsed time between the first time period and the second time period is above a threshold elapsed time, the full lighting estimation update including calculation of a High Dynamic Range (HDR) lighting estimate for the scene for an upcoming time period.

In some implementations, the function is a ratio of the first image measurement to the second image measurement, and the full lighting estimation update uses at least one neural network to calculate the HDR lighting estimate for the scene. In some implementations, the first image measurement and the second image measurement include respective 6-DoF pose measurements associated with the electronic computing device depicting the scene, and the calculation of the partial lighting estimation update is triggered if the determined function is below a predefined threshold and an elapsed time between the first time period and the second time period is below a threshold elapsed time. The partial lighting estimation update may include at least a directional light configuration modification for display in the scene. In some implementations, the partial lighting estimation update represents linearly interpolated lighting estimations that generate gradual illumination changes to the scene according to the function. In some implementations, the partial lighting estimation update estimates an average light intensity for the at least one image. In some implementations, the full lighting estimation update represents a configuration for at least one directional light source, at least one environment map, and a plurality of spherical harmonic coefficients.

In some implementations, the method further includes determining an occurrence of a pose change, associated with the scene, from the first time period to the second time period and in response to determining if the pose change is above a rotation threshold level or above a translation threshold level, triggering calculation of a High Dynamic Range (HDR) lighting estimate. In addition, the method may include generating an updated lighting estimation for the scene and rendering the scene according to the updated lighting estimation.

In some implementations, the rotation threshold level and the translation threshold level configure, for the electronic computing device, a calculation frequency in which to generate updated High Dynamic Range (HDR) lighting estimates for illuminating the scene with at least one light source.

In a second general aspect, a system is described that includes a camera, at least one processor, and memory storing instructions that, when executed by the at least one processor, cause the system to obtain, from the plurality of frames representing a scene including virtual content, a scene lighting estimation captured for a first frame, the scene lighting estimation including at least a first ambient light intensity measurement of the scene, generate a second ambient light intensity measurement of the scene for a second frame, the second frame occurring after the first frame in the plurality of frames, determine at least one difference between the first ambient light intensity measurement and the second ambient light intensity measurement, and based on the determined at least one difference, triggering calculation of a partial lighting estimation update for the scene including at least a directional light configuration modification, or triggering calculation of a full lighting estimation update for the scene. The processor may also render, for the scene, the virtual content using the partial lighting estimation update using the first ambient light intensity measurement or the render the full lighting estimation update.

Particular implementations of the system may include any or all of the following features. In some implementations, the scene is rendered for an AR session in the AR environment, and the instructions further cause the system to continuously generate a plurality of additional ambient light intensity measurements and using the plurality of additional ambient light intensity measurements, determine whether to trigger calculation of additional partial lighting estimation updates or the full lighting estimation update for the scene, as the scene changes throughout the AR session. In some implementations, the first ambient light intensity measurement and the second ambient light intensity measurement are averaged linear ambient intensity values. In some implementations, the full lighting estimation update uses at least one neural network to calculate the HDR lighting estimate for the scene.

In some implementations, the calculation of the full lighting estimation update is triggered if the determined difference, between the first ambient light intensity measurement and the second ambient light intensity measurement, is above a predefined threshold and an elapsed time between the first frame and the second frame is above a threshold elapsed time, the full lighting estimation update including calculation of a High Dynamic Range (HDR) lighting estimate for the scene for an upcoming time period.

In a third general aspect, a computer program product tangibly embodied on a non-transitory computer-readable medium is described. The computer program product may include instructions that, when executed, are configured to cause at least one processor to obtain, for at least one image of a scene including virtual content, a scene lighting estimation captured at a first time period, the scene lighting estimation including at least a first image measurement associated with the scene, determine a second image measurement associated with the scene at a second time period, the second time period occurring after the first time period, determine a ratio of the first image measurement to the second image measurement, and based on the determined ratio, trigger calculation of a partial lighting estimation update or triggering calculation of a full lighting estimation update. The instructions may further trigger rendering of the virtual content for the scene and using the partial lighting estimation update or the full lighting estimation update.

Particular implementations of the computer program product may include any or all of the following features. In some implementations, the first image measurement and the second image measurement include respective ambient light intensity measurements for the scene, and the calculation of the full lighting estimation update is triggered if the determined ratio is above a predefined threshold and an elapsed time between the first time period and the second time period is above a threshold elapsed time, the full lighting estimation update including calculation of a High Dynamic Range (HDR) lighting estimate for the scene for an upcoming time period. In some implementations, the partial lighting estimation update estimates an average light intensity for the at least one image. In some implementations, the full lighting estimation update represents an illumination configuration to simulate two or more light sources.

In some implementations, the instructions further include determining an occurrence of a pose change, associated with the scene, from the first time period to the second time period. In response to determining the pose change is above a rotation threshold level or above a translation threshold level, the instructions may trigger calculation of a High Dynamic Range (HDR) lighting estimate. The instructions may further include generating an updated lighting protocol for the scene and rendering the scene according to the updated lighting protocol. In some implementations, the rotation threshold level and the translation threshold level configure, for the electronic computing device, a calculation frequency in which to generate updated High Dynamic Range (HDR) lighting estimates for illuminating the scene with at least one light source.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

The use of similar or identical reference numbers in the various drawings is intended to indicate the presence of a similar or identical element or feature.

DETAILED DESCRIPTION

Figure 1A:
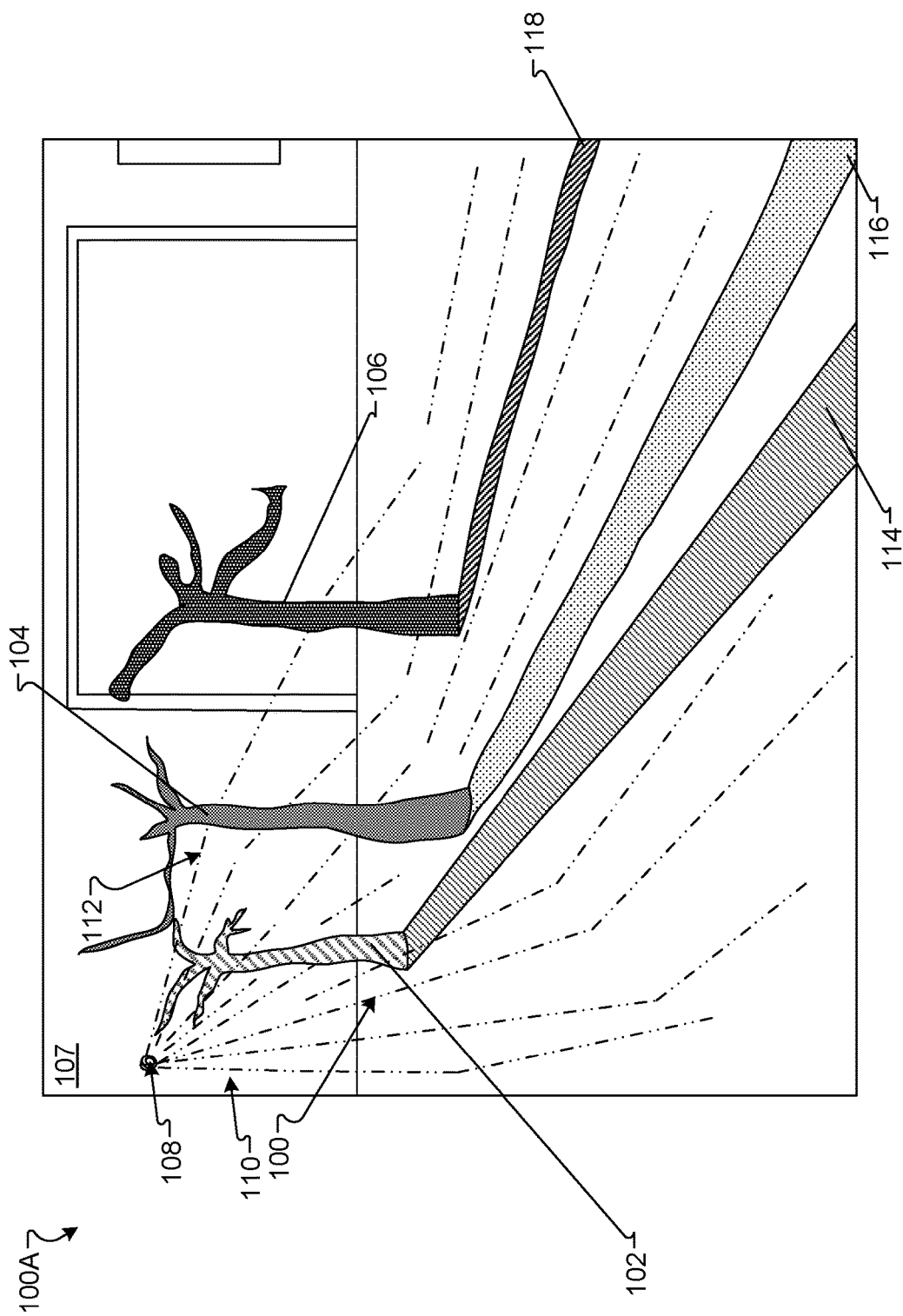
FIGS. 1A-1B illustrate an example Augmented Reality (AR) scene with various lighting characteristics, according to example implementations.

Lighting estimation techniques for Augmented Reality (AR), Virtual Reality (VR), and/or Mixed Reality (MR) are described in detail below. In particular, the described systems and techniques for estimating realistic lighting in AR, VR, and/or MR environments may employ a number of heuristics to determine whether to spend computational resources and timing resources to calculate an updated lighting environment (e.g., generate a lighting estimate) during an AR session. If it is determined that an updated lighting environment is to be calculated (e.g., and generated), the lighting estimation techniques described herein can be used to estimate and/or calculate lighting aspects for an AR scene in the AR session to ensure realistic lighting estimation when compositing content into the scenes and in general, as a user experiences the AR environment during an AR session.

The lighting estimation techniques described herein may include the use of algorithms and neural networks that account for a number of variables that can be used to reduce the cost and/or frequency of performing lighting calculations (e.g., lighting estimations) for particular scenes. Such variables may additionally be used to determine whether to trigger a new lighting environment (e.g., an updated lighting estimation) for a scene.

In short, to avoid the large computational outlay for continually estimating lighting using neural networks at near real-time frame rates, the systems and techniques described herein may utilize computational amortization procedures and heuristics designed to reduce the total computational cost devoted to lighting estimation, without a reduction in visual quality of the rendered result. In some implementations, the systems and techniques may compute lighting estimates at fewer than all image frames, based on the knowledge that lighting during an AR session may not change dramatically, and so current or previous frame lighting can be intelligently propagated from a lighting estimate performed for a previously rendered image frame.

The systems and techniques described herein can provide an improved lighting estimation solution for AR, VR, and/or MR by amortizing the cost of estimating lighting for a scene and determining when to trigger such estimation of the scene lighting. For example, if the systems and techniques described herein determine that a new (e.g., updated) lighting estimation is to be performed, the systems may utilize the lighting estimation techniques to estimate (e.g., calculate) the updated lighting estimation based on timing, image intensity, and pose data (e.g., camera pose data and/or device pose data), just to name a few examples. If the systems described herein instead determine not to perform an updated lighting estimation, then the techniques described herein may be used to propagate past lighting estimates into a current (e.g., present real time) AR, VR, and/or MR scene and thus perform a partial lighting estimate when rendering content and lighting in the scene.

AR, VR, and/or MR systems may have to refresh images displayed to a user in real time at a high rate, such as 24 frames per second (FPS), 30 FPS, 60 FPS, or another rate. Conventional techniques for determining or estimating lighting in a scene from an image may include execution of many computations (or processor cycles), which can be costly. Some traditional techniques utilize prior information about the lighting in an environment, which may not be available for many of the environments in which an AR system is used. The techniques described further herein may allow for lighting inserted virtual content and virtual lighting in a realistic manner without the use of prior knowledge of the environmental lighting while using fewer processor cycles than traditional techniques. Additionally, due to the reduced number of processing cycles utilized by the techniques described herein, these techniques may allow for inserting content and lighting into a captured image/video in a realistic manner while using less power (e.g., battery power on a mobile device) than traditional techniques would employ.

In some implementations, the systems and techniques described herein may provide an improvement over conventional lighting systems because the techniques may determine to perform a partial lighting estimation, which utilizes data from neural networks, past lighting data, and one or more of the variables and/or heuristics described below.

In operation, the systems and techniques described herein may provide a mechanism to use machine learning to estimate high dynamic range (HDR) omnidirectional (360 degree) lighting/illumination to use for lighting and rendering virtual content into real-world scenes, for AR environments, and/or other compositing applications. For example, the systems and techniques described herein can determine when to compute approximated HDR illumination (e.g., full or partial environmental lighting estimations) from a given camera feed of a mobile computing device by accessing the camera, lighting, and timing variables or parameters associated with a particular AR session.

In general, the proposed systems and techniques provide an improved lighting solution that uses machine learning techniques to assess and learn a model that can estimate environmental lighting based on a camera feed of a mobile computing device as input and uses the estimated lighting to illuminate and composite content (e.g., AR objects) realistically into a scene. In some implementations, the proposed systems and techniques can determine when to trigger the estimate of environmental lighting based on the variables described herein. Such variables may include, but are not limited to camera pose, device pose, image intensity, elapsed time, camera settings, user movement, previous light estimations, etc. to determine when and how often (e.g., frequency) to trigger generation of a new full or partial (e.g., updated) lighting estimation for a particular scene.

In some implementations, the systems and techniques described herein include the use of a learning-based method to infer plausible HDR, omnidirectional illumination given an unconstrained, low dynamic range (LDR) image from a mobile computing device camera with a limited field-of-view (FOV). For training data, videos of various reflective spheres placed within the camera's FOV are collected, leaving an amount of the background un-occluded, and leveraging that materials with diverse reflectance functions to reveal different lighting cues in a single exposure. A neural network (e.g., a deep neural network) may be trained to regress from the un-occluded part of the LDR background image to HDR lighting by matching the LDR ground truth sphere images (described below) to those rendered with the predicted illumination using image-based relighting, which is differentiable. The inference executes at interactive frame rates on a mobile computing device, enabling realistic rendering of virtual objects into real scenes for mobile AR, VR, and/or Mixed Reality (MR) environments.

According to example implementations described throughout this disclosure, the computing devices described herein may utilize the described algorithms to determine lighting aspects and to estimate (e.g., calculate) the lighting (e.g., illumination) for any number of AR objects in an AR scene, as the user and/or mobile computing device moves. In some implementations, the computing devices described herein may utilize the described algorithms to determining lighting aspects to estimate (e.g., calculate) the lighting (e.g., illumination) for any number of AR objects in an AR scenes as time passes (e.g., without user movement).

The implementations described throughout this disclosure may solve a technical problem of accurately tracking moving content being captured by a camera of a mobile computing device during an AR experience (e.g., session), for example, and generating (e.g., calculating and/or estimating, etc.) realistic lighting environments for the scenes provided in the device during the AR session. Such lighting environments may be generated with technical accuracy with respect to a variety of image aspects and lighting and rendering pipeline techniques, including lighting virtual objects with multiple point or directional lights, reflection mapping, shadow mapping, ambient occlusions, spherical harmonics, and HDR image-based lighting techniques including global illumination based rendering. In some implementations, the systems and techniques described herein can generate lighting representations (e.g., a lighting estimate) that includes any or all of a single light point, a directional light source, an environment map for a scene or AR environment, and/or a number of spherical harmonic coefficients.

The technical solutions described herein may provide a technical effect of determining when to compute a lighting environment based on detected changes occurring in a scene. The computed lighting environment can be used to ensure that objects placed (e.g., composite) into the scene are rendered with light and shadow, according to an accurate depth, color, light, and perception for the scene.

In some implementations, a lighting inference (e.g., estimation) from a background image may be executed at interactive frame rates, thus producing lighting estimates at a rate of about 12-20 frames per second when running on a mobile computing device processor, for example. However, continually estimating lighting using neural networks at such near real-time frame rates uses significant computational resources, while potentially causing heat transfer throughout the mobile computing device (or other display/computer device) and excess battery consumption. The systems and techniques described herein may employ computational amortization heuristics designed to reduce the total computational resources that are devoted to lighting estimation, without reducing visual quality of the rendered result. In some implementations, the systems and techniques may determine a need for, and carry out lighting estimate computations with fewer frames, based on the knowledge that lighting during an AR session may not change dramatically, and thus lighting in a current (e.g., present, real time) frame can be intelligently propagated from a lighting estimate associated with a previous frame.

The technical solutions described herein may provide an additional technical effect of assessing whether or not to trigger performance of full or partial lighting estimations (e.g., updates) based on the variables described herein, thereby saving computational cost for lighting a scene and/or environment and mitigating mobile device/wireless computing device battery consumption. For example, rather than trigger performance of lighting estimations on a per frame basis, a per time basis, or other interval, the systems and techniques described herein may instead use any or all measurable and/or determinable scene variables, camera variables, sensor readout variables, image variables, pose variables, and the like, to determine whether there is a compelling reason for a scene lighting estimation update. If it is determined not to perform an entire lighting estimation update, partial lighting estimations (e.g., updates) may be carried out to ensure particular light changes are carried out based on detected sensor data form the computing device.

In some implementations, the technical solutions described herein may provide an additional technical effect of temporal smoothing/filtering. For example, since the lighting estimates described herein are configured to be computed with less frequency to save computing resources, the systems described throughout can temporally smooth (e.g., filter) across any number of frames to prevent abrupt changes in lighting. This may provide an advantage of serving lighting estimates at any time instance (or responsive to a user query) while permitting abrupt changes in lighting when necessary to catch up to changing environmental conditions, for example. Available measurements including, but not limited to camera settings, motion, overall image intensity, color changes, light sensor changes etc., may be used to infer dynamic smoothing parameters in order to slowly and smoothly adjust lighting when environmental factors have little variation. This may also enable the systems described herein to quickly snap to new lighting estimates when changes in the environmental factors vary widely.

FIG. 1A illustrates an example Augmented Reality (AR) scene 100A with various lighting characteristics, according to example implementations. To generate scene 100A, an example AR system captures images of the physical space surrounding a user. The AR system may then determine a location to insert content and/or lighting. For example, the system may receive a user input indicating a location on the screen for the content. The content may be placed at the location indicated by the user or at a location on a plane corresponding to a surface such as a floor or the ground that is below the location indicated by the user. The AR system may also estimate and/or calculate lighting characteristics in order to illuminate any and all content in the scene 100A. The lighting characteristics may then be generated and rendered in the scene.

As shown in FIG. 1A, a scene 100A includes three AR trees 102, 104, and 106 within a physical space 107. The three AR trees 102, 104, and 106 are backlit by a light source 108. The light source 108 illuminates the scene 100A, as at least partially indicated by dotted lines beginning at line 110 and ending at line 112. Such lighting is one example of lighting for the AR scene 100A. The scene 100A represents an AR environment that includes inserted AR content (e.g., trees 102, 104, and 106) displayed over an image of the physical space 107. In this example, the tree 102 includes a shaded region 114 (e.g., a shadow) caused by light source 108 casting light onto the tree 102. Similarly, tree 104 includes a shadow 116 while tree 106 includes a shadow 118. The shaded region 114 may be shaded in accord with the light source 108, determined, for example, by a lighting engine executing the techniques described herein.

In operation, the systems and techniques described herein may determine one or more regions of the image that correspond to one or more virtual objects (e.g., content). The system may then extract image properties from the one or more regions and use those properties to light the content (e.g., trees 102, 104, and 106). For example, a brightness (or luminosity) value may be extracted from one of the regions and the extracted brightness value may be scaled and used as a brightness property for an overhead lighting source. In some implementations, a brightness (or luminosity) value may be extracted from another of the regions and that extracted brightness value can be scaled and used as a brightness property for an additional light source (e.g., a lower light source).

In some implementations, other properties, such as hue and saturation, are also extracted from the one or more regions. These properties may be modified (e.g., scaled, partially desaturated) and then used as properties of upper and/or lower light sources. The lighted content may then be presented to the user (e.g., overlaid on a captured image of the physical space 107 surrounding the user, projected/displayed on an optical combiner disposed within the user's field of view, etc.).

In some implementations, each shaded region may include a region of inserted content (e.g., a tree in this example) with surface normals that are directed downward (i.e., the vertical component of the surface normal vector is less than zero) and other shaded regions may include a region of the inserted content (e.g., a tree) with surface normals that are directed upward (i.e., the vertical component of the surface normal vector is greater than zero).

At some point, the device 202 (shown in FIG. 2 and described in more detail later below) may employ power saving and/or computational cost saving techniques by gating the lighting calculations in a scene during an AR session. For example, the device 202 may use lighting engine 228 to assess particular image measurements occurring in a scene over time for purposes of triggering minor (e.g., partial) lighting updates (e.g., estimates) or full lighting updates (e.g., estimates) for the scene.

Figure 1B:
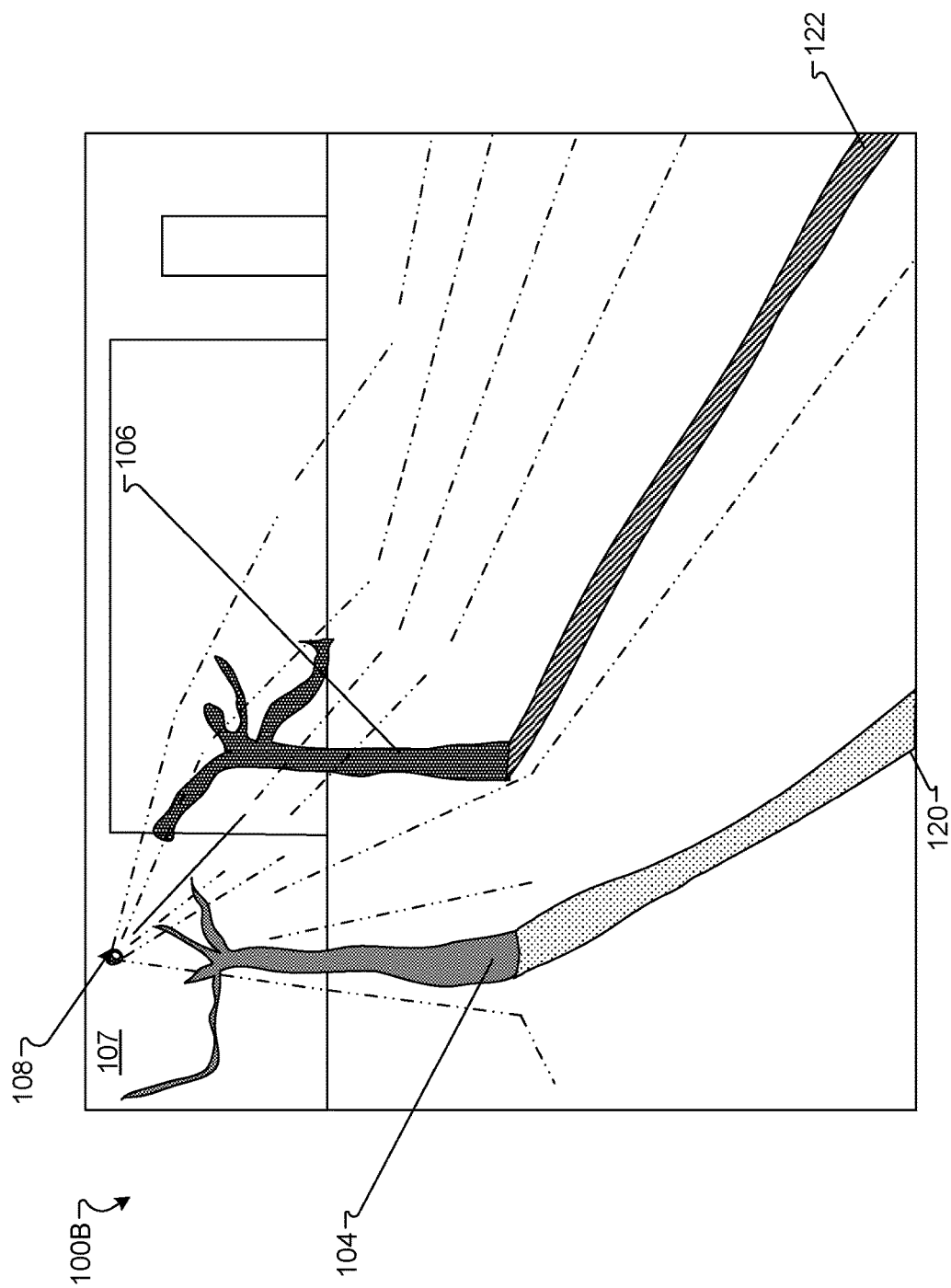

For instance, in FIG. 1B, the scene 100B has shifted slightly from the scene 100A. Here, the systems described throughout this disclosure may determine whether or not to trigger calculation of a partial lighting estimation update or instead trigger calculation of a full lighting estimation update (e.g., an HDR lighting estimate). For example, a computing device presenting the AR environment may detect timing, movement, and image data to determine whether or not to perform particular lighting estimation updates.

To do so, the computing device may obtain a scene lighting estimation for at least one image of a scene rendered in the Augmented Reality (AR) environment. The scene lighting estimation may be for a first time period and the scene lighting estimation may include at least a first image measurement associated with the scene. For example, the image measurement may include an ambient lighting intensity for an image of the scene. The computing device may determine a second image measurement associated with the scene at a second time period. For example, the computing device can determine an ambient lighting intensity at the current time for the scene 100B. The computing device can use the current ambient lighting intensity and can calculate a function of the current ambient lighting intensity to the first ambient lighting intensity (e.g., from a latest i.e., recently performed lighting estimate). Such a function may include a difference between (and/or ratio between) two ambient lighting intensities. If the output of the function is small (i.e., the ambient lighting intensity remains about the same or unchanged from frame to frame), the computing device can compute a time difference between the previous lighting estimate to a current image frame, for example. If the time difference is small (e.g., within a threshold level), a minor (e.g., partial) update may be triggered to be calculated to obtain an update on any lighting representation for an image and/or scene (e.g., all lighting, directional light, and/or cubemap data, etc.). In some implementations, the computing device may trigger calculation of a relative motion (e.g., translation and/or rotation) associated with the image, the computing device, and/or the scene.

The relative motion may be calculated from a previous lighting estimate to a current frame. If the relative motion is small (e.g., within a threshold level), the computing device may trigger performance of a partial update on the lighting for a particular image and/or scene. If neither of the above calculations are triggered, then the computing device may trigger calculation of a full lighting estimation update. Regardless of whether a partial lighting estimation update or a full lighting estimation update is determined, the updated lighting may be rendered on a screen of the computing device.

In general, particular thresholds and threshold levels may be configured for the scenes and AR environments described herein. In some implementations, thresholds may be raised or lowered from a particular value to improve lighting quality. In some implementations, thresholds may be raised or lowered from a particular value to improve device battery, processing speed and/or computational cost, and the like.

In the depicted example of scene 100B, the translation movements between scene 100A and 100B indicate that a new full lighting may be triggered. Thus, an updated illumination pattern is shown emitting from light source 108, which triggers the computing device 102 to also determine updated shadowing effects 120 and 122, respectively for tree 104 and tree 106. In addition, lighting and shadowing is removed for content (tree 102 and shadow 114) because the content is no longer in the scene 100B. Additional lighting changes may be calculated and rendered and the above recited updates are mere examples of illumination modifications for a scene.

Although scenes 100A and 100B include a single light source, any number of light sources may be possible and the techniques described herein may generate lighting estimations for each source and for the entire scene.

Figure 2:
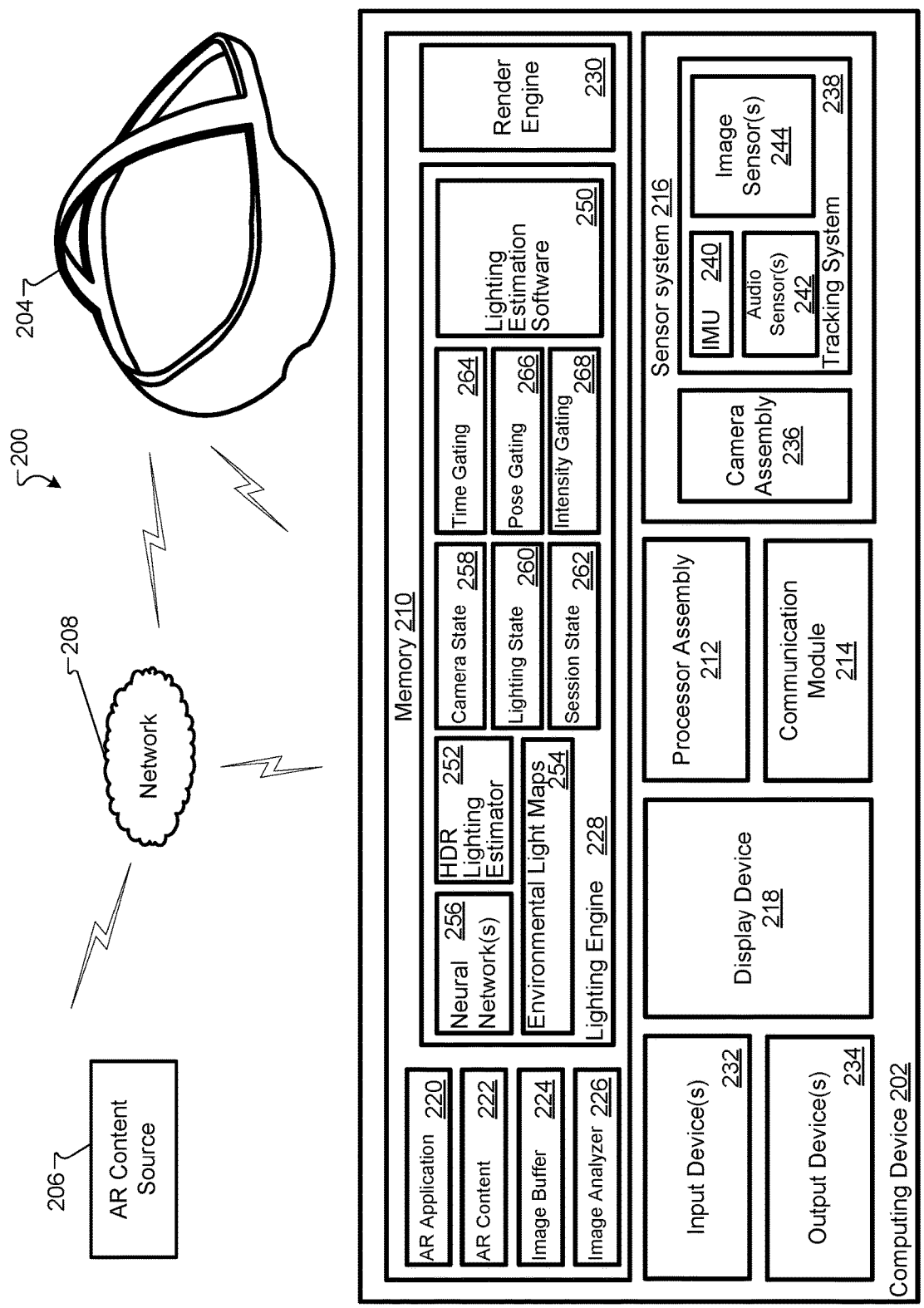
FIG. 2 is a block diagram of an example computing device with framework for generating a lighting estimation for an AR experience, according to example implementations.

FIG. 2 is a schematic illustration showing a system 200 that includes an example computing device 202 with framework for generating a lighting estimation for an AR experience, according to example implementations. The system 200 may be used to generate lighting estimations for AR, VR, and/or MR environments. In general, the computing device (e.g., a mobile device, a tablet, a laptop, an HMD device, a smart watch, etc.) 202 can generate the lighting conditions to illuminate an AR scene. In addition, the device 202 can generate the AR environment for a user of the system 200 to trigger rendering of the AR scene with the generated lighting conditions on device 202, or another device. In some implementations, the system 200 includes the computing device 202, a head-mounted display (HMD) device 204, and an AR content source 206. Also shown is a network 208 over which the computing device 202 may communicate with the AR content source 206.

The computing device 202 includes a memory 210, a processor assembly 212, a communication module 214, a sensor system 216, and a display device 218. The memory 210 may include an AR application 220, AR content 222, an image buffer 224, an image analyzer 226, a lighting engine 228, and a render engine 230. The computing device 202 may also include various user input devices 232 such as one or more controllers that communicate with the computing device 202 using a wireless communications protocol. In some implementations, the input device 232 may include, for example, a touch input device that can receive tactile user inputs, a microphone that can receive audible user inputs, and the like. The computing device 202 may also one or more output devices 234 The output devices 234 may include, for example, a display for visual output, a speaker for audio output, and the like.

The computing device 202 may also include any number of sensors and/or devices in sensor system 216. For example, the sensor system 216 may include a camera assembly 236 and a 3-DoF and/or 6-DoF tracking system 238. The tracking system 238 may include (or have access to), for example, light sensors, inertial measurement unit (IMU) sensors 240, audio sensors 242, image sensors 244, distance/proximity sensors (not shown), positional sensors (not shown), and/or other sensors and/or different combination(s) of sensors. Some of the sensors included in the sensor system 216 may provide for positional detection and tracking of the device 202. Some of the sensors of system 216 may provide for the capture of images of the physical environment for display on a component of a user interface rendering the AR application 220.

In some implementations, the computing device 202 is a mobile computing device (e.g., a smart phone) which may be configured to provide or output AR content to a user via the HMD 204. For example, the computing device 202 and the HMD 204 may communicate via a wired connection (e.g., a Universal Serial Bus (USB) cable) or via a wireless communication protocol (e.g., any Wi-Fi protocol, any Bluetooth protocol, Zigbee, etc.). Additionally, or alternatively, the computing device 202 is a component of the HMD 204 and may be contained within a housing of the HMD 204.

The memory 210 can include one or more non-transitory computer-readable storage media. The memory 210 may store instructions and data that are usable to generate an AR environment for a user.

The processor assembly 212 includes one or more devices that are capable of executing instructions, such as instructions stored by the memory 210, to perform various tasks associated with generating an AR, VR, and/or MR environment. For example, the processor assembly 212 may include a central processing unit (CPU) and/or a graphics processor unit (GPU). For example, if a GPU is present, some image/video rendering tasks, such as shading content based on determined lighting parameters, may be offloaded from the CPU to the GPU.

The communication module 214 includes one or more devices for communicating with other computing devices, such as the AR content source 206. The communication module 214 may communicate via wireless or wired networks, such as the network 208.

The IMU 240 detects motion, movement, and/or acceleration of the computing device 202 and/or the HMD 204. The IMU 240 may include various different types of sensors such as, for example, an accelerometer, a gyroscope, a magnetometer, and other such sensors. A position and orientation of the HMD 204 may be detected and tracked based on data provided by the sensors included in the IMU 240. The detected position and orientation of the HMD 204 may allow the system to in turn, detect and track the user's gaze direction and head movement. Such tracking may be added to a tracking stack that may be polled by the lighting engine 228 to determine changes in device and/or user movement and to correlate times associated to such changes in movement. In some implementations, the AR application 220 may use the sensor system 216 to determine a location and orientation of a user within a physical space and/or to recognize features or objects within the physical space.

The camera assembly 236 captures images and/or videos of the physical space around the computing device 202. The camera assembly 236 may include one or more cameras. The camera assembly 236 may also include an infrared camera.

The AR application 220 may present or provide the AR content 222 to a user via the HMD 204 and/or one or more output devices 234 of the computing device 202 such as the display device 218, speakers (e.g., using audio sensors 242), and/or other output devices (not shown). In some implementations, the AR application 220 includes instructions stored in the memory 210 that, when executed by the processor assembly 212, cause the processor assembly 212 to perform the operations described herein. For example, the AR application 220 may generate and present an AR environment to the user based on, for example, AR content, such as the AR content 222 and/or AR content received from the AR content source 206.

The AR content 222 may include AR, VR, and/or MR content such as images or videos that may be displayed on a portion of the user's field of view in the HMD 204 or on a display 218 associated with the computing device 202, or other display device (not shown). For example, the AR content 222 may be generated with lighting (using lighting engine 228) that substantially matches the physical space in which the user is located. The AR content 222 may include objects that overlay various portions of the physical space. The AR content 222 may be rendered as flat images or as three-dimensional (3D) objects. The 3D objects may include one or more objects represented as polygonal meshes. The polygonal meshes may be associated with various surface textures, such as colors and images. The polygonal meshes may be shaded based on various lighting parameters generated by the AR content source 206 and/or lighting engine 228.

The AR application 220 may use the image buffer 224, image analyzer 226, lighting engine 228, and render engine 230 to generate images for display via the HMD 204 based on the AR content 222. For example, one or more images captured by the camera assembly 236 may be stored in the image buffer 224. The AR application 220 may determine a location to insert content. For example, the AR application 220 may prompt a user to identify a location for inserting the content and may then receive a user input indicating a location on the screen for the content. The AR application 220 may determine the location of the inserted content based on that user input. For example, the location for the content to be inserted may be the location indicated by the user accessing the AR experience. In some implementations, the location is determined by mapping the location indicated by the user to a plane corresponding to a surface such as a floor or the ground in the image (e.g., by finding a location on the plane that is below the location indicated by the user). The location may also be determined based on a location that was determined for the content in a previous image captured by the camera assembly (e.g., the AR application 220 may cause the content to move across a surface in that was identified within the physical space captured in the image).

The image analyzer 226 may then identify a region of the image stored in the image buffer 224 based on the determined location. The image analyzer 226 may determine one or more properties, such as brightness (or luminosity), hue, and saturation, of the region. In some implementations, the image analyzer 226 filters the image to determine such properties. For example, the image analyzer 226 may apply a mipmap filter (e.g., a trilinear mipmap filter) to the image to generate a sequence of lower-resolution representations of the image. The image analyzer 226 may identify a lower resolution representation of the image in which a single pixel or a small number of pixels correspond to the region. The properties of the region can then be determined from the single pixel or the small number of pixels. Alternatively, the properties of the region may be determined by averaging some (e.g., a random sample) or all of the pixels in the region. The lighting engine 228 may then generate one or more light sources or environmental light maps 254 based on the determined properties. The light sources or environmental light maps can be used by the render engine 230 to render the inserted content or an augmented image that includes the inserted content.

In some implementations, the image buffer 224 is a region of the memory 210 that is configured to store one or more images. In some implementations, the computing device 202 stores images captured by the camera assembly 236 as a texture within the image buffer 224. Alternatively or additionally, the image buffer 224 may also include a memory location that is integral with the processor assembly 212, such as dedicated random access memory (RAM) on a GPU.

In some implementations, the image analyzer 226, lighting engine 228, and render engine 230 may include instructions stored in the memory 210 that, when executed by the processor assembly 212, cause the processor assembly 212 to perform operations described herein to generate an image or series images that are displayed to the user (e.g., via the HMD 204) and are illuminated using lighting characteristics that are calculated using the neural networks 256 described herein.

The system 200 may include (or have access to) one or more neural networks 256. The neural networks 256 may be a finite impulse recurrent network or an infinite impulse recurrent network. In some implementations, the neural networks 256 may be deep recurrent neural networks with multiple layers. The neural networks 256 may include one or more of an LSMT architecture or a GRU architecture.

The neural networks 256 may include detectors that operate on images to compute, for example, device locations and lighting variables to model predicted lighting for a scene, as a device displaying the scene moves in world space, for example. In addition, the neural networks 256 may operate to compute HDR lighting estimations several timesteps into the future.

The neural networks 256 may make use of omnidirectional lights or light probe images obtained from prior imaging and may use such content for generating particular environmental light maps (or other output images and lighting) from the neural networks.

In some implementations, a two-step methodology, where the neural networks 256 may be a light estimation network (also referred to as deep neural network, convolutional neural network, etc.) predicts a (clipped) light probe image directly (the loss function may be the squared difference or absolute difference between the clipped input probe image and the net output), then the directional light values are obtained by solving a linear system with constrained least squares.

In some implementations, the neural networks store several series of floating point numbers and 2D and/or 3D image convolutions followed by activations (e.g., mapping inputs to numbered outputs). In some implementations, the neural networks can predict 12-20 lighting environments per second.

Captured images and the associated lighting may be used for training the neural networks 256. For example, this includes how to obtain omnidirectional lighting in HDR format, without capturing any HDR imagery. The training data (e.g., captured images) may include LDR images of one or more light probes (not shown) with measured or known bidirectional reflectance distribution function (BRDF) under various (e.g., different) lighting conditions. The appearance of a gray sphere (the gray sphere acting as a light probe) is a convolved version of the environmental lighting. The probe image may be further processed into HDR lighting coefficients by solving a linear system. In some implementations, the types of training data that can be used are general LDR panoramas, of which many more are available.

In general, any number of lighting representations may be used for real time graphics applications. In some implementations, for example, ambient lighting may be used for rendering and AR applications should support environment ambient light estimation. In some implementations, for example, one or more directional lights may be used for rendering and for generating realistic shadows via shadow mapping or for approximating the dominant and distant light sources (e.g. the Sun) in a scene. In some implementations, for example, environmental light mapping may be used. This stores direct 360 degree lighting information. Several typical parameterizations including cube mapping, equirectangular, equiangular mapping, or orthographic projection may be used. In some implementations, spherical harmonics may be used, for example, for modeling low frequency illumination and as precomputed radiance transfer for fast integration.

The lighting engine 228 may be used by device 202 to generate one or more light sources for an AR, VR, and/or MR environment. The lighting engine 228 includes lighting estimation software 250 that may utilize and/or generate an HDR lighting estimator 252, environmental light maps 254, and neural networks 256. The lighting estimation software 250 may execute locally on computing device 202, remotely on a computer of one or more remote computer systems (e.g., a third party provider server system accessible via network 208), a cloud network, or on a combination of one or more of each of the preceding. The lighting estimation software 250 can present a user interface (UI) for displaying related information, such as controls, calculations, and images on a display device 218 of computing device 202, for example. The lighting estimation software 250 is configured to analyze, process, and manipulate data that is generated by the lighting estimation techniques described herein. The lighting estimation software 250 may be implemented to automatically compute, select, estimate, or control various facets of the disclosed lighting estimation approaches, such as the functions used for photographing color charts and/or handling or generating environmental light maps 254.

The neural networks 256 may represent a light estimation network that is trained to estimate HDR lighting using HDR lighting estimator 252 from at least one LDR background image (not shown). The background image may be from a camera view of the computing device 202, for example. In some implementations, the training example may include a background image, an image of a light probe (e.g., sphere) in the same environment, and a bidirectional reflectance distribution function (BRDF) of the light probe, as described below in detail.

The framework illustrated in FIG. 2 supports using a plurality of light probes (not shown) of different materials (e.g., shiny, dull, etc. light probe materials) to train one or more of the neural networks 256. The shiny light probe materials capture high frequency information which may include clipped pixel values in the images. The duller light probe materials capture low information without any clipping. In some implementations, these two sets of data may complement each other so that the neural networks 256 can estimate HDR lighting without HDR training data.

In operation of lighting engine 228, an LDR background image to the light estimation network 104 may be from a camera of computing device 202. In some implementations, an AR framework (e.g., AR software development kit) may support two different images from the camera of the device 202. For example, a 4:3 YUV format frame data for vision tracking and an RGB format pass through video. In some implementations, the RGB format pass through video may be used as input to a light estimation network, such as neural network 256. In some implementations, the 4:3 YUV format frame data may be used as input to the network 256.

The output of HDR lighting estimator 252 (e.g., HDR lighting estimation) using neural networks 256 may be the estimated light (e.g., HDR environment lighting) based on the input image. In some implementations, the networks 256 may initially produce about 208 directional lights from a given input (e.g., based on output probe resolution of 16×16=256, the number of pixels in the output environmental light map 254, and subtracting 12 invalid pixels at each corner, thus 256−48=208). In some implementations, the output probe resolution may be 32×32.

In some implementations, the computing device 202 can generate HDR lighting for a scene based on a threaded model that considers a camera state 258, a lighting state 260, and a session state 262, as described in detail below. In some implementations, the computing device 202 can generate HDR lighting for a scene based on a threaded model that considers time gating 264, pose gating 266, and intensity gating 268, as described in detail below.

The AR application 220 may update the AR environment based on input received from the camera assembly 236, the IMU 240, and/or other components of the sensor system 216. For example, the IMU 240 may detect motion, movement, and/or acceleration of the computing device 202 and/or the HMD 204. The IMU 240 may include various different types of sensors such as, for example, an accelerometer, a gyroscope, a magnetometer, and other such sensors. A position and orientation of the HMD 204 may be detected and tracked based on data provided by the sensors included in the IMU 240. The detected position and orientation of the HMD 204 may allow the system to in turn, detect and track the user's position and orientation within a physical space. Based on the detected position and orientation, the AR application 220 may update the AR environment to reflect a changed orientation and/or position of the user within the environment.

Although the computing device 202 and the HMD 204 are shown as separate devices in FIG. 2, in some implementations, the computing device 202 may include the HMD 204. In some implementations, the computing device 202 communicates with the HMD 204 via a wired (e.g., cable) connection and/or via a wireless connection. For example, the computing device 202 may transmit video signals and/or audio signals to the HMD 204 for display for the user, and the HMD 204 may transmit motion, position, and/or orientation information to the computing device 202.

The AR content source 206 may generate and output AR content, which may be distributed or sent to one or more computing devices, such as the computing device 202, via the network 208. In some implementations, the AR content 222 includes three-dimensional scenes and/or images. Additionally, the AR content 222 may include audio/video signals that are streamed or distributed to one or more computing devices. The AR content 222 may also include all or a portion of the AR application 220 that is executed on the computing device 202 to generate 3D scenes, audio signals, and/or video signals.

The network 208 may be the Internet, a local area network (LAN), a wireless local area network (WLAN), and/or any other network. A computing device 202, for example, may receive the audio/video signals, which may be provided as part of AR content in an illustrative example implementation, via the network 208.

The AR, VR, and/or MR systems described herein can include systems that insert computer-generated content into a user's perception of the physical space surrounding the user. The computer-generated content may include labels, textual information, images, sprites, and three-dimensional entities. In some implementations, the content is inserted for entertainment, educational, or informational purposes.

An example AR, VR, and/or MR system is a portable electronic device, such as a smartphone, that includes a camera and a display device. The portable electronic device may capture images using the camera and show images on the display device that include computer-generated content overlaid upon the images captured by the camera.

Another example AR, VR, and/or MR system includes a head-mounted display (HMD) that is worn by a user. The HMD includes a display device that is positioned in front of a user's eyes. For example, the HMD may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image so as to generate the perception of a three-dimensional scene due to parallax. In some implementations, the HMD includes a chamber in which a portable electronic device, such as a smartphone, may be placed so as to permit viewing of the display device of the portable electronic device through the HMD.

Another example AR, VR, and/or MR system includes an HMD that permits the user to see the physical space while the HMD is being worn. The HMD may include a micro-display device that displays computer-generated content that is overlaid on the user's field of view. For example, the HMD may include an at least partially transparent visor that includes a combiner that permits light from the physical space to reach the user's eye while also reflecting images displayed by the micro-display device toward the user's eye.

When computer-generated content is inserted into an image, lighting may be applied to the content so that the content more closely matches the rest of the image. For example, a three-dimensional model may be rendered using light sources or an environmental light map that approximates the light conditions captured in the image.

Although many examples described herein relate to AR systems inserting and/or compositing visual content into an AR environment, content may be inserted using the techniques described herein in other systems too. For example, the techniques described herein may be used to insert content into an image or video.

In general, the systems and techniques may be carried on a mobile electronic device, such as computing device 202. However, other electronic devices housing or associated with one or more cameras and/or images sensors may be used to carry out the techniques described herein. In some implementations, tracking sensors and an associated tracking stack may also be used as input to carry out lighting estimation techniques.

Figure 3:
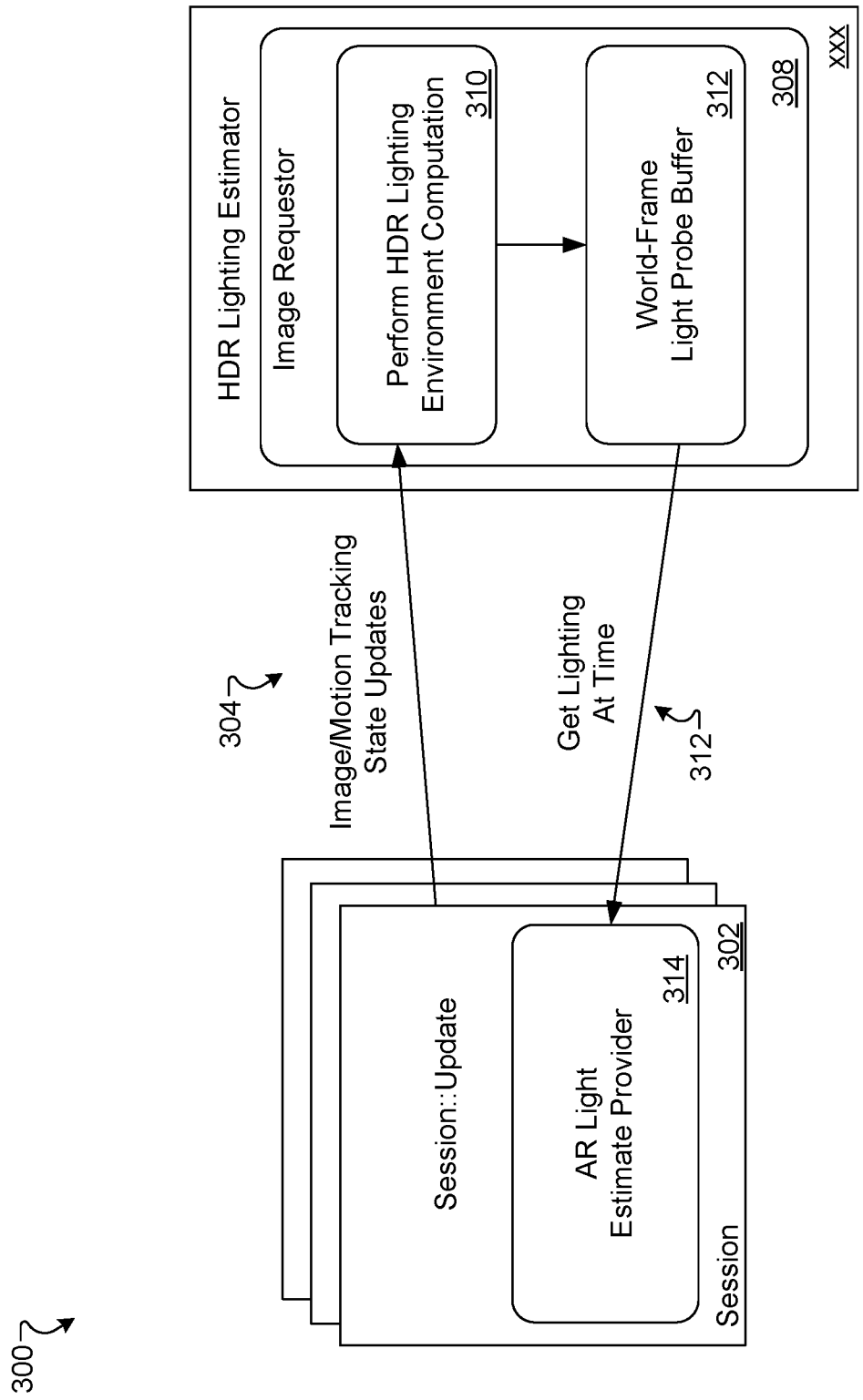
FIG. 3 is a block diagram of an example process of generating a high dynamic range (HDR) lighting environment estimation for at least one session of an AR experience, according to example implementations.

FIG. 3 is a block diagram of an example process 300 of generating a high dynamic range (HDR) lighting estimation for at least one session of an AR experience, according to example implementations. The process 300 may represent a pipeline for generating an image with an HDR lighting estimation for a particular AR session. Such a pipeline may be a multi-threaded model including a camera thread (e.g., indicating a camera state 258), a lighting estimation thread (e.g., indicating a lighting state 260), and a session thread (e.g., indicating a session state 262). The multi-threaded sequence will be described in detail below with reference to FIG. 4.

In operation of process 300, an AR session 302 may be instantiated by a user accessing an electronic device (e.g., the mobile computing device 202). The AR session 302 may be providing content for rendering on the mobile computing device 202. At some point, the mobile computing device 202 may request, via the AR session 302, that image and motion tracking state updates 304 be provided.

For example, the session 302 may provide the updates 304 while the HDR lighting estimator 252 with lighting engine 228 requests the image using an image requestor 308. Next, one or more heuristics may be performed to determine whether or not particular variables trigger performance of a new and/or updated HDR lighting environment computation. The heuristics may be based on assessment of any or all of mobile computing device 202 tracking data (e.g., 3-DoF/6-DoF poses), scene data, timing data, image intensity data, camera setting data, etc. For example, the heuristics may be based on measuring of 3-DoF and/or 6-DoF camera pose data captured by camera assembly 236, and/or IMU 240.

In general, the session 302 may trigger a request to perform HDR lighting environment computation based on an assessment of the mobile computing device 202 and changes in images, time, device state, etc. If an HDR lighting estimation is to be performed 310, the image/motion tracking state updates 304 are retrieved from the session 302 and a world frame light probe buffer 312 retrieves world-frame lighting based on the updates 304 and image retrieved from image request or 308. The buffer 312 may be used to convert known lighting estimates (e.g., training data, previous captured images/video, etc.) into world coordinates. The process 300 may retrieve 312 the lighting at the present time to ensure the new lighting estimate generated by the HDR lighting estimator 252 is compatible with the current lighting of the scene in the session 302. Upon determining that the new lighting estimate is configurable with the session 302, the AR lighting estimate can be provided 314.

In some examples, if the process 300 (running on mobile computing device 202) determines that the pose, the orientation, and/or other device movement has not changed beyond a threshold level, then the process 300 may indicate that a new lighting estimate is unnecessary given the low level of change in position or scene details that may affect lighting. Thus, the process 300 may wait to trigger a lighting estimate until movement-based data reaches or rises above the threshold level. In some implementations, such movement-based data (e.g., tracking data, pose data, orientation data, and/or other sensor data, etc.) can be determined concurrently with lighting estimation triggering such that a sensed movement above a predefined threshold level may instantaneously trigger a new lighting estimation for an AR environment. In some implementations, a session may be configured with a threshold level (e.g., 10 percent, 15 percent, 30 percent, 50 percent, 70 percent, etc.) of device movement that would trigger a new lighting estimate to be performed. Anything below such a threshold level may not trigger the new lighting estimate to be performed.

In some examples, if the process 300 (running on mobile computing device 202) determines that an average image intensity of a live camera feed of an onboard mobile computing device camera has not changed beyond a threshold level, then the process 300 may indicate that a new lighting estimate is unnecessary. For example, an average change of image intensity of about 10 percent to about 15 percent may be the threshold level that may trigger a new lighting estimate to be performed. Anything below such a threshold level may not trigger the new lighting estimate to be performed. In some implementations, the process 300 may save additional battery and/or processing resources by configuring the AR session with an increased threshold level of average image intensity to about 50 percent, for example.

In some examples, if the process 300 (running on mobile computing device 202) determines that a particular amount of time has elapsed during the session, then the process 300 may indicate that a new lighting estimate would be warranted to ensure that content is displayed and illuminated correctly. For example, a time-based threshold may be configured for a session indicating that a new lighting estimate should be generated at a rate of one frame per second, rather than a video frame rate of 24-30 frames per second.

In some examples, if the process 300 (running on mobile computing device 202) determines that significant changes have been made to camera settings (e.g., exposure time), a new lighting estimate may be triggered to account for the changes to the camera settings.

Although one session 302 is described above, any number of sessions may be instantiated by the user or shared and/or separately instantiated by other users. Such sessions may simultaneously receive the same lighting estimation updates according to the systems and techniques described herein.

Figure 4:
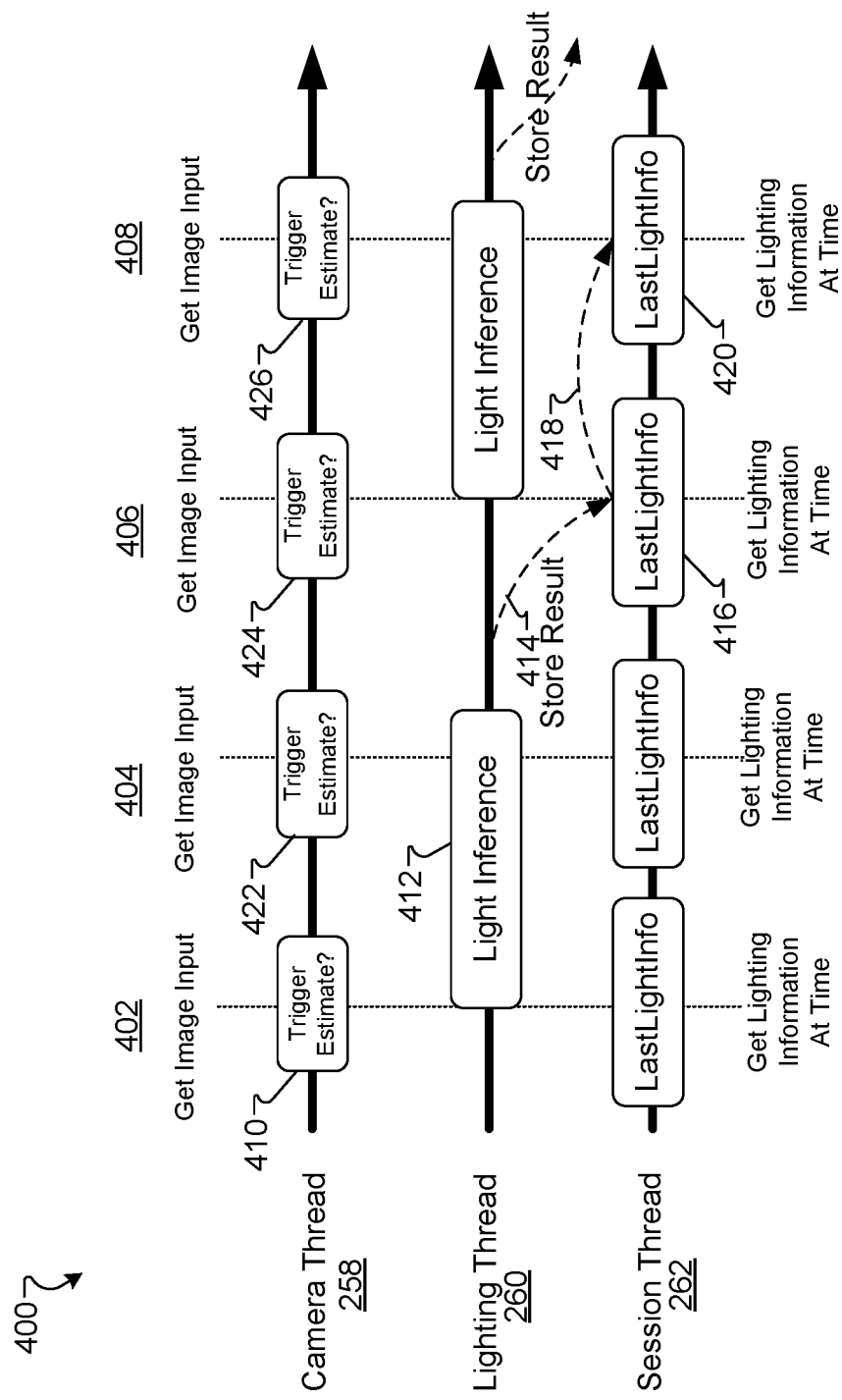
FIG. 4 is a block diagram of an example threaded model for generating a lighting environment estimation for an AR experience, according to example implementations.

FIG. 4 is a block diagram of an example threaded model 400 for generating a lighting environment estimation for an AR experience, according to example implementations. A camera thread 258 is depicted to indicate a state or a change in state of the camera (or properties associated with the camera) over time. A lighting thread 260 is depicted to indicate a state or a change in state of the lighting conditions (or properties associated with the lighting conditions) over time. A session thread 262 is depicted to indicate a state or a change in state of the session (or properties associated with the session) over time.

A user may begin an AR session operating on computing device 202, for example, to begin the execution of the model 400. As shown in FIG. 4, a number of times include a time (t1) 402, a time (t2) 404, a time (t3) 406, and a time (t4) 408. Although four times are depicted, any number of times may be shown and used in the threaded model 400 the analysis shown and described with respect to FIG. 4 may continue until an AR session is ended, for example. At any point in time, any one of the camera thread 258, lighting thread 260, and session thread 262 can trigger a lighting estimate to be computed by the lighting engine 228 and/or other components of system 200, for example.

During time t1 402, the camera thread 258 may retrieve an image. For example, the lighting engine 228 may obtain an image and/or video that is being (or has been) captured by computing device 202. The computing device 202 may determine 410 whether or not to trigger performance of an HDR lighting estimate for the image and/or video for rendering in a particular AR session. For example, the device 202 can perform a number of heuristics associated with the camera of device 202 in order to amortize the overall computational expense for HDR lighting. For example, the camera state 258 can be retrieved and compared to a prior camera state to determine if a 3-DoF or a 6-DoF pose of the device 202 has changed by a particular amount. In particular, if the device 202 is determined to have rotated by about 8 to about 10 degrees or more, an HDR lighting estimate may be triggered to obtain updated lighting for a scene in the AR session. Similarly, if a translation of about 0.0005 to about 0.0007 meters is detected by sensor system 216, for example, an HDR lighting estimate may be triggered to obtain updated lighting for a scene in the AR session. In some implementations, the heuristics may include time gating, intensity gating, and/or pose gating, as described in further detail below.

The above described heuristics can function to parameterize lighting such that it may be insensitive to minor rotational camera motion at the application programming interface (API) level and to compute an updated HDR lighting estimate (e.g., a light probe estimate to generate an HDR lighting estimate). That is, light probe estimates, as discussed above may be stored in world coordinates that the lighting engine 228 may use to generate world-coordinate HDR lighting estimates to users. Such estimates may be synchronized with a tracking stack used by device 202 to enable updated world node information and rotational information for updating lighting information. The world-coordinate HDR lighting estimates may be provided to an API for rendering by the render engine 230.

Continuing with time t1 402, the camera thread 258 may trigger a computation of an updated HDR lighting estimate. If the computation is triggered, the lighting thread 260 may trigger a new thread to obtain the image at time t1 402 and to execute a light inference 412 to retrieve current lighting conditions for the image. The light inference may refer to a neural network inference call (e.g., execution request) to obtain information associated with generating an HDR lighting estimate for a scene at a particular time.

In some implementations, the lighting thread 260 may trigger conversion of such conditions or image content to world coordinates to correct for orientation errors that may exist in the original image and/or any training data associated neural networks 256 when generating HDR lighting estimates. The result of the light inference and/or corrections to orientation may be stored 414 as last known lighting information 416 and further may be carried over 418 to additional time periods (e.g., as shown by time t3 406 and by time t4 408 at last known lighting information 420).

The session thread 262 may function to store the last known lighting information 416 and 420 and other retrieved last known lighting conditions. In addition, the session thread may check that the last known lighting information is correctly retrieved and may provide such information at the current real time. This information may be used to provide camera frame lighting when the system 202 determines to trigger computation of a new or updated HDR lighting estimate for a scene.

The model 400 may continue to check for triggering an updated HDR lighting estimate at each new time period, as indicated by the determinations performed at 422, 424, and 426. If the system instead determines that the trigger conditions are not met, the HDR lighting estimate is not triggered for computation.

Figure 5:
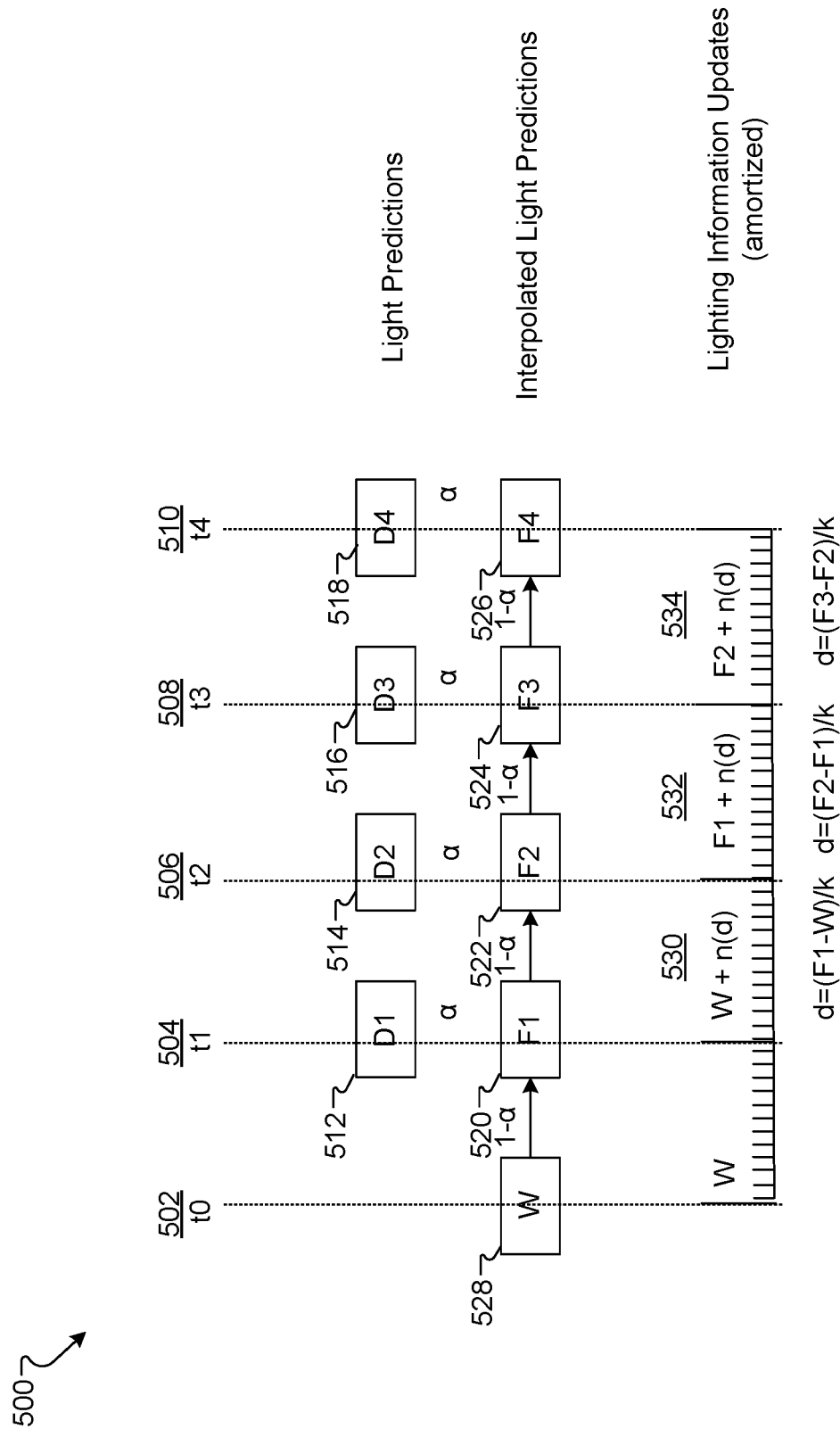
FIG. 5 is an example process for generating a lighting environment estimation, according to example implementations.

FIG. 5 is an example process 500 for generating a lighting environment estimation, according to example implementations. The process 500 may ensure that lighting estimates for particular scenes and/or images are triggered when warranted with respect to processing cost and requirements of an AR session presenting the scene. In some implementations, the processes described herein (including process 500) can improve fast reactions to large changes in ambient lighting, without increasing computational cost. One example large change in ambient lighting may be the lighting change as a light switch is turned off or on in an indoor environment.

At some point, a user may begin an AR session operating on computing device 202, for example, to begin the execution of process 500. As shown in FIG. 5, a number of times include a time (t0) 502, a time (t1) 504, a time (t2) 506, and a time (t3) 508, and time (t4) 510. Although five times are depicted, any number of times may be shown and used in the threaded model 400 the analysis shown and described with respect to FIG. 5 may continue until an AR session is ended, for example.

A number of neural network inferences (e.g., light predictions) can be performed to generate HDR lighting estimates for a scene. The inferences shown here include (D1) 512, (D2) 514, (D3) 516, and (D4) 518. Each respective inference occurs at a particular timestamp 504-510, as indicated under each respective timestamp. An inference may include the lighting engine 228 estimating a lighting environment (e.g., and/or environmental light map 254) for a scene using the neural network 256 to generate an HDR lighting estimation (or other minor and/or partial lighting adjustment) while utilizing information about any or all of the camera state 258, the lighting state 260, the session state 262, time status (e.g., time gating 264), pose status (e.g., pose gating 266), and/or intensity status (e.g., intensity gating 268).

Upon generating each inference, the predictions (e.g., inferences 512, 514, 516, and/or 518) may be provided to functions to be linearly interpolated using first order smoothing techniques. That is, first order smoothing may be used to linearly interpolate the neural network-generated light probes in world space to generate smoothed filtered lighting representations (F1) 520, (F2) 522, (F3) 524, and (F4) 526, at respect timestamps 504-510. An average valued gray probe (W) 528 may be used as an initial probe for the linear interpolating.

As shown at time stamp (t0) 502, the probe (W) 528 is the lighting information in an amortized state because no light estimates have been generated at time (t0) 502. For timestamps 504-510, lighting information is returned via API calls from the AR session (e.g., client application) without having to perform any new or updated neural network. That is, the computing device 202 does not trigger a new or updated HDR lighting estimate, but instead can perform a partial lighting estimation update. In this example, a new value 530 for (F2) can be calculated by linearly interpolating (F1) 520 using the probe (W) value and a number of time steps with respect to a maximum number of time steps. For example, a new value 530 for (F2) 522 may be calculated using the following equation:

$$F2(\text{new}) = W + n(d) \qquad [1]$$

where $d=(F1-W)/k$; n=step counter; k=maximum number of steps

In another example, a new value 532 for (F3) 524 can be calculated by linearly interpolating (F2) 522 using (F1) 520 and a number of time steps with respect to a maximum number of time steps. For example, a new value 532 of (F3) 524 may be calculated using the following equation:

$$F3(\text{new}) = F1 + n(d) \qquad [2]$$

where $d=(F2-F1)/k$; n=step counter; k=maximum number of steps

In another example, a new value 534 for (F4) 526 can be calculated by linearly interpolating (F3) 524 using F(2) 522 and a number of time steps with respect to a maximum number of time steps. For example, a new value 534 of (F4) 526 may be calculated using the following equation:

$$F4(\text{new}) = F2 + n(d) \qquad [3]$$

where $d=(F3-F2)/k$; n=step counter; k=maximum number of steps

In the above calculations, in order to generate smooth transitions, the current state of lighting to be returned via the API may be timed one second behind the neural network inferences 512-518. For example, at [t3] 508, the lighting returned to the AR session via the API is equivalent to the lighting represented by [F2] 522. Between [t3] 508 and [t4]

510, the lighting returned to the AR session via the API is equivalent to a linear interpolation between [F2] 522 and [F3] 524.

The partial lighting estimation updates described above in FIG. 5 may be performed, for example, if the device 202 determines that less than a threshold amount of time (e.g., one second, five seconds, etc.) has passed since a lighting update was performed. Similarly, a partial lighting update may also be performed if the device 202 detects a slight rotation or translation of the image and/or device (e.g., more than a threshold of about 10 degrees rotation or about 0.0007 meters translation. If the measurements are larger than the above thresholds, for example, a new HDR lighting estimation may be triggered and performed.

Figure 6:
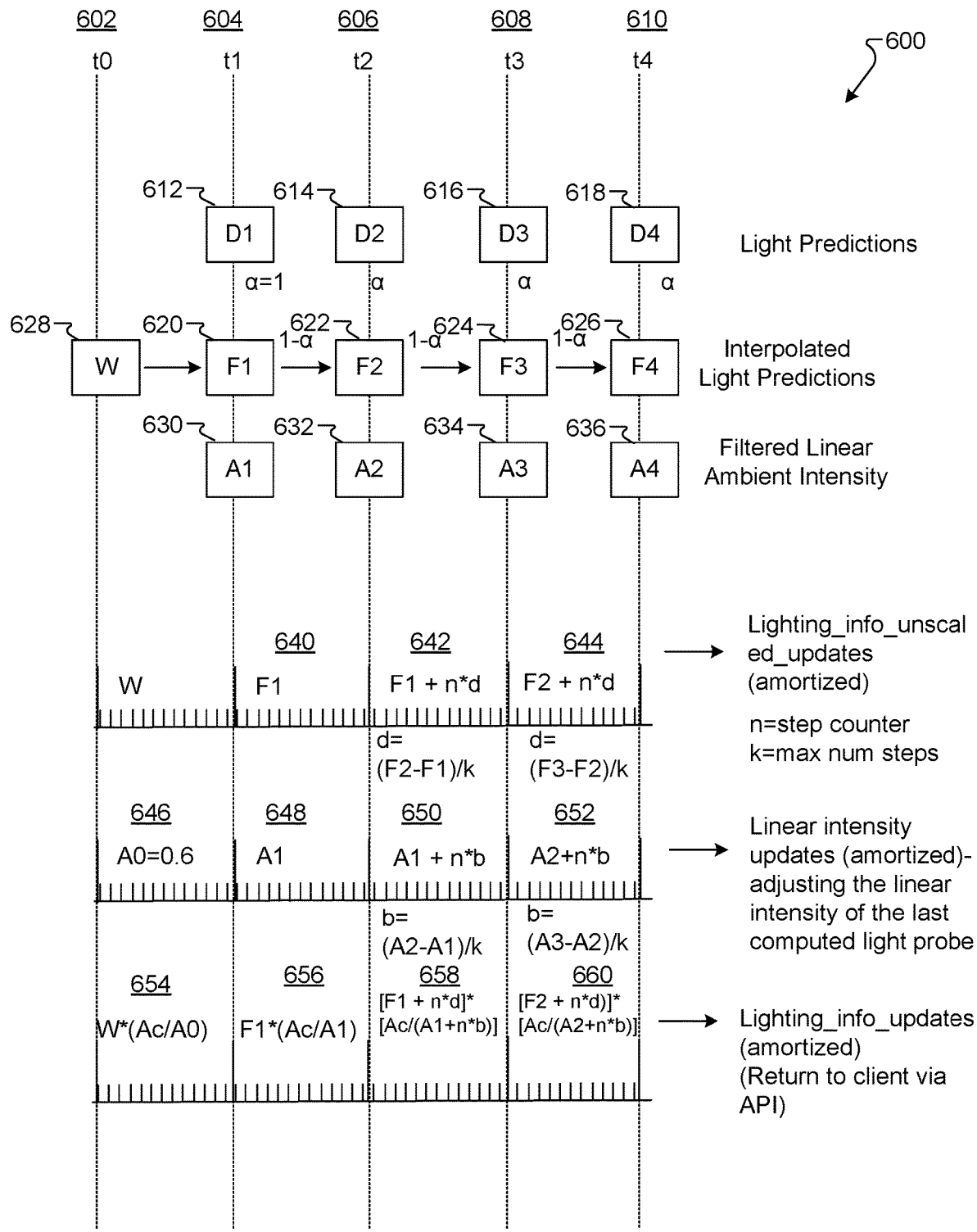
FIG. 6 is another example process for generating a lighting environment estimation, according to example implementations.

FIG. 6 is another example process 600 for generating a lighting environment estimation, according to example implementations.

The process 600 may ensure that lighting estimates for particular scenes and/or images are triggered when warranted with respect to processing cost and requirements of an AR session presenting the scene. In some implementations, the processes described herein (including process 600) can allow for a quick reaction to a rapid intensity change within an image without introducing additional computational overhead. In this process 600, measurements can be made at every frame (or every other frame, every five frames, etc.).

In some implementations, the measurements may be associated with an overall lighting intensity for a known scene (or image). The overall lighting intensity can be used to scale up or scale down a most recent lighting estimate as needed for the AR session. Such measurements may be recorded for particular images (or scenes) and can be used by the neural network lighting inferences described herein. One example measurement may include a retrieved and/or recorded ISO sensitivity for a particular frame (or frames). To retrieve the ISO sensitivity measurement (associated with the camera state 258, for example), the lighting engine 228 may generate a query for the ISO sensitivity for a particular image being rendered (or about to be rendered) in an AR session. If the ISO sensitivity is above a predefined threshold level, a lighting calculation may be triggered to obtain particular minor (e.g., partial) updates to the lighting environment. If the ISO sensitivity is outside of a predefined range, a new HDR lighting estimate may be triggered to perform a full neural-network based lighting estimation for the scene (e.g., or image).

In some implementations, the measurements may be associated with a retrieved and/or recorded exposure time for a particular frame (or frames). To retrieve the exposure time measurement (associated with the camera state 258, for example), the lighting engine 228 may generate a query for the exposure time for a particular image being rendered (or about to be rendered) in an AR session. If the exposure time is above a predefined threshold level, a lighting calculation may be triggered to obtain particular minor (e.g., partial) updates to the lighting environment. If the exposure time is outside of a predefined range, a new HDR lighting estimate may be triggered to perform a full neural-network based lighting estimation for the scene (e.g., or image).

In some implementations, the measurements may be associated with a retrieved and/or recorded ambient image intensity measurement through a tracking stack or other tracking or lighting monitor or sensor. If the ambient image intensity (e.g., accessed by intensity gating 268) is above a predefined threshold level, a lighting calculation may be triggered to obtain particular minor (e.g., partial) updates to the lighting environment. If the ambient image intensity is outside of a predefined range, a new HDR lighting estimate may be triggered to perform a full neural-network based lighting estimation for the scene (e.g., or image).

For example, the device 202 may calculate a relative change in a linear (or pseudo-linear) average image intensity at a time of the last computation of a full HDR lighting estimate (using neural networks 256) compared to a current frame rendered in the AR session. This may represent a relative ambient intensity ratio. If the relative ambient intensity ratio is greater than 50 percent, the device 202 may trigger the lighting engine 228 to perform (e.g., calculate, determine, etc.) an HDR lighting estimate. In some implementations, the if the ambient intensity ratio is greater than 10 percent, the device 202 may trigger an HDR lighting estimate (e.g., a full lighting estimate). Lowering the threshold percentage for the ratio may ensure the lighting is calculated (e.g., estimated) more often than when the device 202 is operating at a higher threshold percentage. In some implementations, comparisons can be made between particular ambient lighting intensities over time to determine differences amongst the intensities. Such differences may be used to trigger or suppress particular lighting calculations.

In some implementations, the measurements may be associated with a retrieved and/or recorded time measurement for a particular frame (or frames). If the time measurement (e.g., accessed by time gating 264) is above a predefined threshold level, a lighting calculation may be triggered to obtain particular minor (e.g., partial) updates to the lighting environment. If the time measurement is outside of a predefined range, a new and/or updated HDR lighting estimate may be triggered to perform a full neural-network based lighting estimation for the scene (e.g., or image). For example, during an AR session, if the device 202 determines that less than 1 second has passed, the device 202 may trigger lighting engine 228 to perform a partial lighting update on the directional light and HDR probe image (associated with the neural network), but may not compute a new and/or updated full HDR lighting estimate.

In some implementations, the device 202 may employ pose gating 266 to trigger one or more lighting estimates. For example, if sensor system 216 loses motion tracking status for the AR session, the lighting engine 228 may determine to forego (i.e., not compute) an updated lighting environment (including not executing an HDR lighting estimate). In addition, such a loss of motion tracking may not trigger lighting updates for any value, but may set a timestamp to zero, as indicated in FIGS. 5 and 6. So that the next time motion tracking is found (e.g., available), a new HDR lighting estimate may be computed.

In some implementations, the device 202 may detect an amount of rotation or translation below a threshold level (e.g., detecting device 202 as near stationary). In response, the lighting engine 228 may determine to forego a minor lighting update and may forego a computation of a new HDR lighting estimate because the device 202 is not actively moving over large ranges of distances and/or rotations. However, if device 202 detects a slight rotation or translation (e.g., between about 8 and about 12 degrees rotation or about 0.0005 to 0.0009 meters of translation), the lighting engine 228 may trigger a minor (e.g., partial) lighting update on the directional light and/or an HDR probe image, for example, but may forego a new computation of a new HDR lighting estimate. If the device 202 instead is determined to be experiencing a larger rotation or translation (e.g., greater than 12 percent rotation and/or 0.0010 meters of translation), the lighting engine 228 may trigger computation of a new HDR lighting estimate.

In some implementations, the lighting engine 228 may select a particular measurement in order to scale lighting estimates. For example, during a live AR session, both the ISO sensitivity and exposure time may continually vary, indicating that the imaging sensor is employing both auto-gain and auto-exposure operations to try to maintain image pixel values within a particular range. The lighting engine 228 uses an internal lighting representation that is relative to the exposure time, as the video feed is auto-exposing and auto-gaining. In general, the associated training data (for the neural networks 256) may be collected using the same representation.

In one non-limiting example, the lighting engine 228 may determine an image intensity of 0.5 at a one second exposure and may also determine a relative light intensity of 1.0 at a one second exposure. The lighting engine 228 may have a total light in a scene while maintaining the same exposure time. A new image intensity at one second exposure may be calculated as 0.25 and a new relative light intensity at one second may be calculated as 0.5. The lighting engine 228 may compensate for this pixel intensity difference by automatically multiplying the exposure time by 2. The result may include a new image intensity of 0.5 at two seconds exposure for half the light in the scene and a new relative light intensity of 1.0 at two second exposure for half the light in the scene. Such a calculation may indicate that if the total light in the scene is halved, the relative light intensity should not change as a function of the exposure time or ISO. However, this exact predictable, linear auto-exposure behavior may not be observed in operation of lighting engine 228 during an AR session. For example, when the lights are switched off in a room, both the ISO sensitivity and the exposure time increase to brighten the image, but the average pixel intensity after these operations relative to that from before the lights were turned off is still lower, resulting in a darker, noisy image of a dark room. This residual image intensity difference is not typically accounted for in the relative light units until a new full neural network compute is initiated. Thus, the lighting engine 228 may determine instead to use one or more per-frame measurements as the ambient intensity estimate—which is an operation fast enough to execute at every frame in order to compute the average image intensity using spatial sub-sampling. This may be used to directly measure a residual image intensity difference that is leftover after auto-exposing.

In general, the process 600 may store internally two lighting information structures. A first structure includes an HDR lighting estimate with directional lights. A second structure includes a scaled representation of the first structure. The second structure may be newly biased by the per-frame computed average linear ambient intensity.

Referring again to FIG. 6, at some point, a user may begin an AR session operating on computing device 202, for example, to begin the execution of process 600. As shown in FIG. 6, a number of times include a time (t0) 602, a time (t1) 604, a time (t2) 606, and a time (t3) 608, and time (t4) 610. Although five times are depicted, any number of times may be shown and used in the threaded model 400 the analysis shown and described with respect to FIG. 6 may continue until an AR session is ended, for example.

A number of neural network inferences (e.g., light predictions) can be performed by lighting engine 228 to generate HDR lighting estimates for a scene. The inferences shown here include (D1) 612, (D2) 614, (D3) 616, and (D4) 618. Each respective inference occurs at a particular timestamp 604-610, as indicated under each respective timestamp. An inference may include the lighting engine 228 estimating a lighting environment (e.g., and/or environmental light map 254) for a scene using the neural network 256 to generate an HDR lighting estimation (or other minor or partial lighting adjustment) while utilizing information about any or all of the camera state 258, the lighting state 260, the session state 262, time status (e.g., time gating 264), pose status (e.g., pose gating 266), and/or intensity status (e.g., intensity gating 268).

Upon generating each inference, the predictions (e.g., inferences 612, 614, 616, and/or 618) may be provided to functions to be linearly interpolated using first order smoothing techniques. For example, the inferences 612-618 may be linearly interpreted from frame zero to frame one and so on. In some implementations, first order smoothing may be used to linearly interpolate the neural network-generated light probes in world space to generate smoothed filtered lighting representations (F1) 620, (F2) 622, (F3) 624, and (F4) 626, at respect timestamps 604-610. An average valued gray probe (W) 628 may be used as an initial probe for the linear interpolating.

Next, the interpolated light predictions 620-626 may be linearly filtered (e.g., smoothened) to determine an ambient intensity. Here, each respective interpolated light prediction 620-626 may be filtered to output (A1) 630, (A2) 632, (A3) 634, and (A4) 636.

As shown at time stamp (t0) 602, the probe (W) 628 is the lighting information in an amortized state because no light estimates have been generated at time (t0) 602. For timestamps 604-610, lighting information is returned via API calls from the AR session (e.g., client application) without having to perform any new or updated neural network. That is, the computing device 202 does not trigger a new or updated HDR lighting estimate, but instead can perform a minor (e.g., partial) lighting estimation update or use a last known state, as shown by 640.

In another example, a new value 642 for (F3) 624 can be calculated by linearly interpolating (F2) 624 using (F1) 620 and a number of time steps with respect to a maximum number of time steps. For example, a new value 642 of (F3) 624 may be calculated using the following equation:

$$F3(\text{new}) = F1 + n^*(d) \quad [4]$$

where $d=(F2-F1)/k$; $n$=step counter; $k$=maximum number of steps

In another example, a new value 644 for (F4) 626 can be calculated by linearly interpolating (F3) 624 with respect to a maximum number of time steps. For example, a new value 644 of (F4) 626 may be calculated using the following equation:

$$F4(\text{new}) = F2 + n^*(d) \quad [5]$$

where $d=(F3-F2)/k$; $n$=step counter; $k$=maximum number of steps

Further a number of amortized linear intensity updates may be performed to adjust the linear intensity of the last computed light probe. As shown in FIG. 6, at time t0 602, an initial ambient intensity 646 is set and/or determined as (A0)=0.6. Similarly, an ambient intensity 648 may be determined at time (t1) 604. A new ambient intensity 650 may be generated by updating the linear intensity at time (t2) 606 using the following equation:

$$A2(\text{new}) = A1 + n^*b \quad [6]$$

where $b=(A2-A1)/k$; $n$=step counter; $k$=maximum number of steps

A new ambient intensity 652 may be generated by updating the linear intensity at time (t3) 608 using the following equation:

$$A3(\text{new}) = A2 + n*b \quad [7]$$

where b=(A3−A2)/k; n=step counter; k=maximum number of steps

Next, the amortized updates to the lighting may be returned to the device 202 by the lighting engine 228. For example, a lighting estimation update 654 may be determined for time (t1) using the following equation:

$$W*(Ac/A0) \quad [8]$$

where Ac is the linear ambient intensity measured for a current image (calculated at every frame.)

A lighting estimation update 656 may be determined for time (t2) 606 using the following equation:

$$F1*(Ac/A1) \quad [9]$$

where Ac is the linear ambient intensity measured for a current image (calculated at every frame)

A lighting estimation update 658 may be determined for time (t3) 608 using the following equations:

$$[F1 + n*d]*[Ac/A1 + n*b)] \quad [10]$$

where Ac is the linear ambient intensity measured for a current image (calculated at every frame); b=(A2−A1)/k; n=step counter; k=maximum number of steps; d is (F2−F1)/k A lighting estimation update 660 may be determined for time (t4) 610 using the following equation:

$$[F2 + n*d)]]*[Ac/A2 + n*b)] \quad [11]$$

where b=(A3−A2)/k; n=step counter; k=maximum number of steps; Ac is the linear ambient intensity measured for a current image (calculated at every frame); d is (F3−F2)/k In some implementations, the process 600 can ensure that a scaled representation of the HDR lighting estimate is stored at each frame using the average intensities, as described above. An unscaled representation of the HDR lighting estimate (and directional lights) may also be stored as well. This may ensure that interpolation occurs on the unscaled space rather than the scaled space. The scale factor for each frame is compute using the following equation:

$$\text{Scale} = [A/A'] \quad [12]$$

where A=ambient intensity of current frame; A'=interpolated ambient intensity from the last HDR lighting estimate computation For example, if the last full HDR lighting estimate computation was computed at time (t1) with an ambient intensity of 0.5 and a new image at time (t2) is darker with an ambient intensity of 0.25, the intensity scale factor ratio is calculated as 0.25/0.5, yielding lighting at time (t2) that is half as bright as the lighting at time (t1).

Each time device 202 triggers to test a new frame (e.g., a new HDR lighting estimate is executed for the new frame), the lighting engine 228 computes the scale factor, scale the lighting estimate, and copy (e.g., store) the value into a lighting vector for querying by the light system.

In some implementations, the lighting engine 228 can compute the linear average ambient intensity rather than the average pseudo-linear ambient intensity or an average linear ambient intensity. For instance, gamma may be represented by 2.2 as a linearization curve for three pixel values (x, y, z) by the following equation:

$$((x/255)^{2.2} + (y/255)^{2.2} + (z/255)^{2.2})/3 \neq ((x+y+z)/3*255)) \quad [13]$$

Thus, system 202 implements a true linear pixel intensity sub-sampling-based averaging function that takes as input the image and an LUT vector of length 256, for fast look-ups. The LUT-based technique is used to increase the speed of the calculations and to save processing power. In some implementations, a threshold operation is added that removes pixels with values greater than 250 (out of 255), if the pixels are close to (or at the point of) saturating the image sensor represent bright light sources rather than surfaces or objects reflecting the illumination from the scene.

Figure 7:
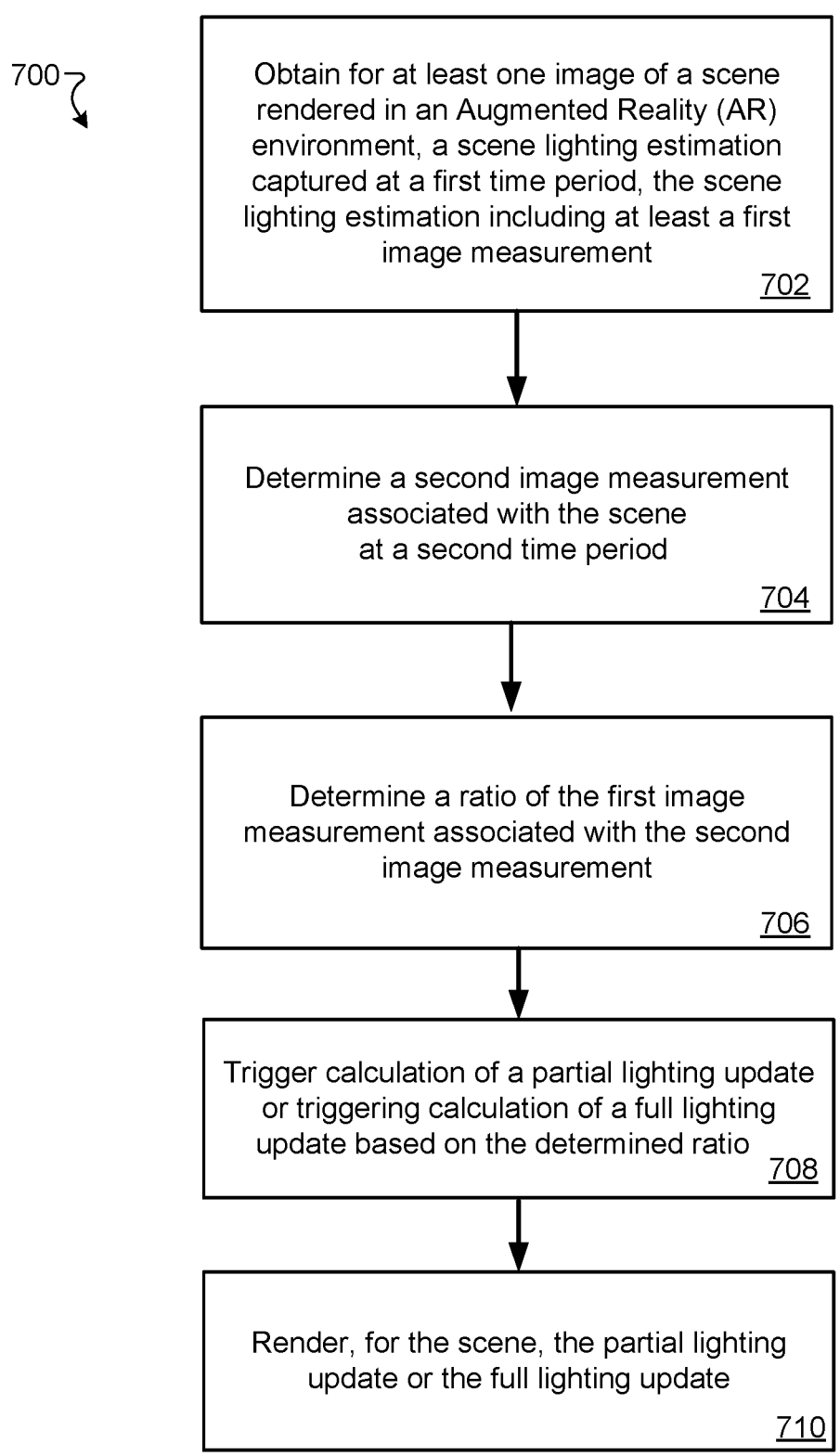
FIG. 7 is an example process to assess computational amortization of heuristics for triggering generation of a lighting environment estimation, according to example implementations.

FIG. 7 is an example process 700 to assess computational amortization of heuristics for triggering generation of a lighting environment estimation, according to example implementations. The process 700 will be described with respect to the system of FIG. 2, however, any electronic device with a camera and particular sensors may employ the process 700.

At block 702, the process 700 may include obtaining, at an electronic computing device and for at least one image of a scene rendered in an Augmented Reality (AR) environment, a scene lighting estimation captured at a first time period. For example, the computing device 202 may be rendering a scene in an AR session. The device 202 may obtain a scene lighting estimation from an earlier time in the AR session. The scene lighting estimation may include at least a first image measurement (e.g., image light measurement) associated with the scene. In some implementations, the first image measurement may include an ambient light intensity measurement for the scene. An image measurement may additionally or instead represent a flux indicating an amount of energy (e.g., measured in lumens) emitted by a particular light per second. An image measurement may additionally or instead represent an intensity (e.g., light intensity measured in candelas) indicating a quantity of visible light that is emitted in unit time per unit solid angle from a light source. An image measurement may additionally or instead represent an illuminance (e.g., measured in Lux) indicating an amount of luminous flux per unit area. An image measurement may additionally or instead represent luminance (e.g., measured in Nit) indicating an intensity of light from a surface per unit area in a given direction.

In some implementations, the first image measurement may include 6-DoF pose measurement associated with the electronic computing device depicting the scene. For example, the device 202 may determine (e.g., measure) 3-DoF poses or 6-DoF poses of the camera onboard the device. If the pose indicates that the device 202 has not moved or has moved less than a threshold amount, then a full (e.g., new) lighting estimate may not provide additional interest or lighting change to the user and thus, device 202 may determine not to perform the full lighting estimate.

At block 704, the process 700 may include determining, at the electronic computing device (e.g., computing device 202), a second image measurement associated with the scene at a second time period where the second time period occurs after the first time period. For example, the second image measurement may include an ambient light intensity measurement for the scene at a current time (i.e., in real time). In some implementations, the second image measurement may include a 6-DoF pose measurement associated with the electronic computing device depicting the scene and at a current time (i.e., in real time). In real time may indicate at the time of render of a currently accessed frame, scene, and/or image.

At block 706, the process 700 may include determining, at the electronic computing device, a ratio (or other function) of the first image measurement associated with the second image measurement. For example, the lighting engine 228 may calculate the ratio (or other function) of the ambient light intensity measurement at the first time period to the ambient light intensity measurement at the second time period. Any or all of the ratio (or other function) calculations may utilize the camera state 258, the lighting state 260, and/or the session state 262.

At block 708, the process may trigger device 202 to calculate, based on the determined ratio, a partial lighting estimation update or trigger calculation of a full lighting estimation update. Determining which calculation to trigger may be based at least in part on the ratio (or other function) as compared to a predefined threshold (e.g., level) associated with the image measurements, for example.

In some implementations, the calculation of the full lighting estimation update is triggered if the determined ratio (or other function) is above a predefined threshold. In some implementations, the full lighting estimation update is triggered if the ratio (or other function) is above the predefined threshold and an elapsed time between the first time period and the second time period is below a threshold elapsed time. That is, if enough time has passed between the first time period and the second time period, the lighting engine 228 may trigger a new (e.g., updated) full lighting estimation update, which may include calculation of an HDR lighting estimate for the scene for an upcoming time period.

In some implementations, the calculation of the full lighting estimation update is triggered if the determined ratio (or other function) is above a predefined threshold and an elapsed time between the first time period and the second time period is above a threshold elapsed time, the full lighting estimation update including calculation of a High Dynamic Range (HDR) lighting estimate for the scene for an upcoming time period. For example, if the lighting engine 228 determines that a larger amount of time has elapsed between time periods, calculation of a full lighting estimate may be triggered because lighting for a scene may change drastically over a larger elapsed time. In some implementations, the full lighting estimation update uses at least one neural network to calculate the HDR lighting estimate for the scene, as described in detail above. In some implementations, the full lighting estimation update represents an illumination configuration for two or more light sources. For example, the full lighting estimation update may include illumination configurations for the sun, the moon, a spot light, an upward facing light, a downward facing light, or any combination of light effects, configurations, and combinations for illuminating a scene and/or image.

In some implementations, the partial lighting estimation update represents linearly interpolated lighting estimations that generate gradual illumination changes to the scene according to the ratio, as described in detail above. In some implementations, the partial lighting estimation update estimates an average light intensity for the at least one image.

In the example in which the first image measurement and the second image measurement include respective 6-DoF pose measurements associated with the electronic computing device depicting the scene, the calculation of the partial lighting estimation update may be triggered if the determined ratio is below a predefined threshold and an elapsed time between the first time period and the second time period is below a threshold elapsed time. The partial lighting estimation update may, for example, include at least a directional light configuration modification for display in the scene. At block 710, the partial lighting estimation update or the full lighting estimation update may be rendered on a screen of the electronic computing device and for the scene.

In the above-described implementations, triggering of the calculation of a partial lighting estimation update or of a full lighting estimation update may be performed based on a ratio between first image measurement of an image (taken at a first time) and a second image measurement of the image (taken at a second time). However, in other implementations, the triggering of the calculation of the partial lighting estimation update or of the full lighting estimation update may be performed based on a different function of the first and second image measurements instead of or in addition to the ratio. Such functions may include, but are not limited to determination of a ratio and/or difference amongst measured values of ambient light intensity, radiant flux for a frame, radiant intensity for a frame, irradiance of a frame, and/or radiance of a frame.

In some implementations, the process 700 may include determining an occurrence of a pose change, associated with the scene, from the first time period to the second time period. For example, the sensor system 216 may determine if the computing device 202 has changed pose. In response to determining the pose change is above a rotation threshold level or above a translation threshold level, the device 202 may trigger calculation of an HDR lighting estimate (e.g., a full lighting estimation update). In addition, the device 202 may generate an updated lighting protocol for the scene and render the scene according to the updated lighting protocol. In some implementations, the rotation threshold level and the translation threshold level configure, for the computing device 202, a calculation frequency in which to generate updated HDR lighting estimates for illuminating the scene with at least one light source.

In some implementations, the process 700 may be carried out by a system including a camera, at least one processor, and memory storing instructions that, when executed by the at least one processor, cause the system to obtain, from a plurality of frames representing a scene rendered in an Augmented Reality (AR) environment, a scene lighting estimation captured for a first frame. The scene lighting estimation may include at least a first ambient light intensity measurement of the scene. The system may also generate a second ambient light intensity measurement of the scene for a second frame The second frame may occur in the AR session after the first frame in the plurality of frames. The system may determine a ratio of the first ambient light intensity measurement to the second ambient light intensity measurement and based on the determined ratio may trigger calculation of a partial lighting estimation update for the scene including at least a directional light configuration modification, or trigger calculation of a full lighting estimation update for the scene. The system may then render, for the scene, the partial lighting estimation update using the first ambient light intensity measurement or the render the full lighting estimation update. In some implementations, the scene is rendered for an AR session in the AR environment. In some implementations, a plurality of additional ambient light intensity measurements are continuously generated and used to determine whether to trigger calculation of additional partial lighting estimation updates or the full lighting estimation update for the scene, as the scene changes throughout the AR session. In some implementations, the first ambient light intensity measurement and the second ambient light intensity measurement are averaged linear ambient intensity values.

In some implementations, the calculation of the full lighting estimation update is triggered if the determined ratio is above a predefined threshold and an elapsed time between the first frame and the second frame is above a threshold elapsed time. The full lighting estimation update ay include calculation of an HDR lighting estimate for the scene for an upcoming time period. In some implementations, the full lighting estimation update uses at least one neural network to calculate the HDR lighting estimate for the scene. Other image measurements that may be used may include light sensor thresholds such as flash brightness, addition of virtual content or objects, acceleration and/or other translation detection of movement of the computing device.

Figure 8:
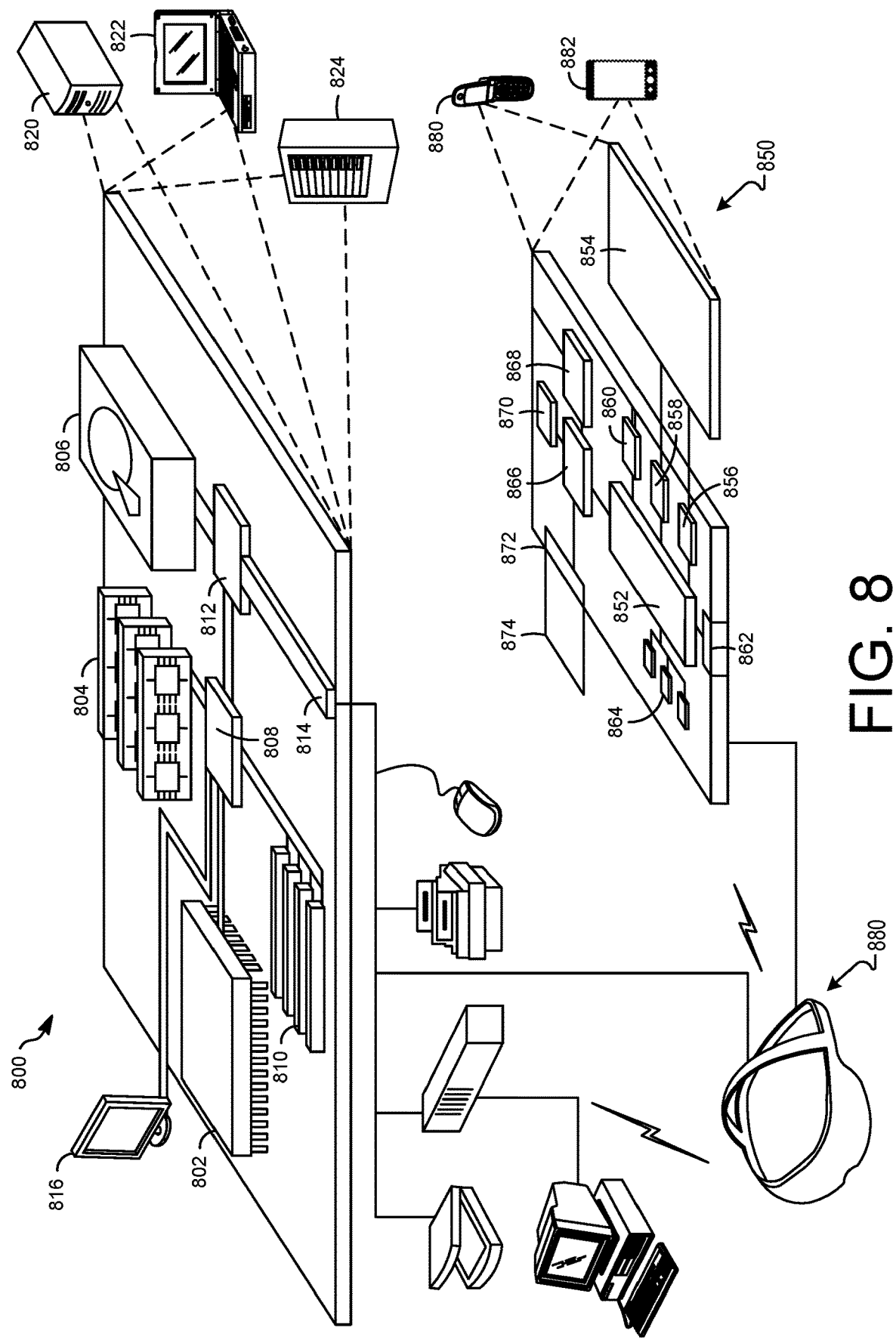
FIG. 8 illustrates an example of a computer device and a mobile computer device, which may be used with the techniques described here.

FIG. 8 shows an example computer device 800 and an example mobile computer device 850, which may be used with the techniques described here. In general, the devices described herein can generate and/or provide any or all aspects of a virtual reality, an augmented reality, or a mixed reality environment. Features described with respect to the computer device 800 and/or mobile computer device 850 may be included in the portable computing device 100 described above. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the systems and techniques claimed and/or described in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) or light emitting diode (LED) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

The computing device based on example embodiments described herein may be implemented using any appropriate combination of hardware and/or software configured for interfacing with a user including a user device, a user interface (UI) device, a user terminal, a client device, or a customer device. The computing device may be implemented as a portable computing device, such as, for example, a laptop computer. The computing device may be implemented as some other type of portable computing device adapted for interfacing with a user, such as, for example, a PDA, a notebook computer, or a tablet computer. The computing device may be implemented as some other type of computing device adapted for interfacing with a user, such as, for example, a PC. The computing device may be implemented as a portable communication device (e.g., a mobile phone, a smart phone, a wireless cellular phone, etc.) adapted for interfacing with a user and for wireless communication over a network including a mobile communications network.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 80 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combi-

What is claimed is:

1. A computer-implemented method, the method comprising:
obtaining, at an electronic computing device and for at least one image of a scene rendered in an Augmented Reality (AR) environment, a scene lighting estimation captured at a first time period, the scene lighting estimation including at least a first image measurement associated with the scene;
determining, at the electronic computing device, a second image measurement associated with the scene at a second time period, the second time period occurring after the first time period;
triggering, at the electronic computing device, calculation of a partial lighting estimation update in response to a difference between a first pose associated with the first image measurement and a second pose associated with the second image measurement being below a predefined threshold and in response to an elapsed time between the first time period and the second time period being below a threshold elapsed time, the first image measurement and the second image measurement include respective 6-DoF pose measurements associated with the electronic computing device depicting the scene;
triggering calculation of a full lighting estimation update in response to a function determined using the first image measurement and the second image measurement; and
rendering, on a screen of the electronic computing device and for the scene, the scene using the partial lighting estimation update or the full lighting estimation update, the partial lighting estimation update including a directional light configuration modification for display in the scene.

2. The method of claim 1, wherein:
the first image measurement and the second image measurement include respective ambient light intensity measurements for the scene, and
the calculation of the full lighting estimation update is triggered if the determined function is above the predefined threshold and the elapsed time between the first time period and the second time period is above the threshold elapsed time, the full lighting estimation update including calculation of a High Dynamic Range (HDR) lighting estimate for the scene for an upcoming time period.

3. The method of claim 2, wherein:
the function is a ratio of the first image measurement to the second image measurement, and
the full lighting estimation update uses at least one neural network to calculate the HDR lighting estimate for the scene.

4. The method of claim 1, wherein the partial lighting estimation update represents linearly interpolated lighting estimations that generate gradual illumination changes to the scene according to the function.

5. The method of claim 1, wherein the partial lighting estimation update estimates an average light intensity for the at least one image.

6. The method of claim 1, further comprising determining an occurrence of a pose change, associated with the scene, from the first time period to the second time period;
in response to determining if the pose change is above a rotation threshold level or above a translation threshold level, triggering calculation of a High Dynamic Range (HDR) lighting estimate; and
generating an updated lighting estimation for the scene;
rendering the scene according to the updated lighting estimation.

7. The method of claim 6, wherein the rotation threshold level and the translation threshold level configure, for the electronic computing device, a calculation frequency in which to generate updated High Dynamic Range (HDR) lighting estimates for illuminating the scene with at least one light source.

8. The method of claim 1, wherein the full lighting estimation update represents a configuration for at least one directional light source, at least one environment map, and a plurality of spherical harmonic coefficients.

9. A computer program product tangibly embodied on a non-transitory computer-readable medium and comprising instructions that, when executed, are configured to cause at least one processor to:
obtain, for at least one image of a scene including virtual content, a scene lighting estimation captured at a first time period, the scene lighting estimation including at least a first image measurement associated with the scene;
determine a second image measurement associated with the scene at a second time period, the second time period occurring after the first time period, the first image measurement and the second image measurement include respective 6-DoF pose measurements associated with an electronic computing device depicting the scene;
determine a ratio of the first image measurement to the second image measurement;
trigger calculation of a partial lighting estimation update in response to the determined ratio being below a predefined threshold and an elapsed time between the first time period and the second time period being below a threshold elapsed time, the partial lighting estimation update including a directional light configuration modification for display in the scene;
trigger calculation of a full lighting estimation update in response to the determined ratio; and
render, for the scene, the virtual content using the partial lighting estimation update or the full lighting estimation update.

10. The computer program product of claim 9, wherein:
the first image measurement and the second image measurement include respective ambient light intensity measurements for the scene, and
the calculation of the full lighting estimation update is triggered if the determined ratio is above the predefined threshold and the elapsed time between the first time period and the second time period is above the threshold elapsed time, the full lighting estimation update including calculation of a High Dynamic Range (HDR) lighting estimate for the scene for an upcoming time period.

11. The computer program product of claim 9, wherein the partial lighting estimation update estimates an average light intensity for the at least one image.

12. The computer program product of claim 9, further comprising determining an occurrence of a pose change, associated with the scene, from the first time period to the second time period;
in response to determining the pose change is above a rotation threshold level or above a translation threshold level, triggering calculation of a High Dynamic Range (HDR) lighting estimate; and generating an updated lighting protocol for the scene;

rendering the scene according to the updated lighting protocol.

13. The computer program product of claim 12, wherein the rotation threshold level and the translation threshold level configure, for the electronic computing device, a calculation frequency in which to generate updated High Dynamic Range (HDR) lighting estimates for illuminating the scene with at least one light source.

14. The computer program product of claim 9, wherein the full lighting estimation update represents an illumination configuration to simulate two or more light sources.

* * * * *